(12) United States Patent
Wikfors et al.

(10) Patent No.: US 11,491,419 B2
(45) Date of Patent: Nov. 8, 2022

(54) GAS-LIQUID SEPARATOR FOR COLLECTING CHROMATOGRAPHIC FRACTIONS

(71) Applicant: Agilent Technologies, Inc., Santa Clara, CA (US)

(72) Inventors: Edwin E. Wikfors, Landenberg, PA (US); Samuel O. Colgate, Gainesville, FL (US)

(73) Assignee: Agilent Technologies, Inc., Santa Clara, CA (US)

( * ) Notice: Subject to any disclaimer, the term of this patent is extended or adjusted under 35 U.S.C. 154(b) by 938 days.

(21) Appl. No.: 16/325,855

(22) PCT Filed: Aug. 15, 2016

(86) PCT No.: PCT/US2016/047056
§ 371 (c)(1),
(2) Date: Feb. 15, 2019

(87) PCT Pub. No.: WO2018/034649
PCT Pub. Date: Feb. 22, 2018

(65) Prior Publication Data
US 2019/0184327 A1    Jun. 20, 2019

(51) Int. Cl.
*B01D 19/00* (2006.01)
*B01D 15/08* (2006.01)
(Continued)

(52) U.S. Cl.
CPC ......... *B01D 19/0042* (2013.01); *B01D 15/08* (2013.01); *B01D 15/24* (2013.01);
(Continued)

(58) Field of Classification Search
CPC ........ B01D 15/08; B01D 15/24; B01D 15/40; B01D 19/00; B01D 19/0042; B01D 19/0063; G01N 30/80; G01N 30/84
See application file for complete search history.

(56) References Cited

U.S. PATENT DOCUMENTS 5,076,349 A     12/1991  Kadono et al.
2001/0005986 A1  7/2001  Matsubara et al.
(Continued)

FOREIGN PATENT DOCUMENTS

CN     101773876 A     7/2010
CN     102216769 A    10/2011
(Continued)

OTHER PUBLICATIONS

International Search Report and Written Opinion issued in counterpart PCT Application No. PCT/US2016/047056 dated Feb. 14, 2017 (eight (8) pages).

*Primary Examiner* — Benjamin L Lebron

(57) ABSTRACT

A gas-liquid separator includes a fluid inlet, a shell including an inside surface enclosing an interior space, an outlet structure with fingers converging toward a longitudinal axis, and a dripper including a dripper tip. The fingers terminate at fingertips located proximate to an outside surface of the dripper. Gas exit ports are defined between adjacent fingers, and by the dripper. The gas-liquid separator defines a liquid flow path from the fluid inlet, along the inside surface, along one or more of the fingers, converging along the dripper outside surface, and to the dripper tip. The gas-liquid separator also defines a gas flow path from the fluid inlet, through the interior space, and through the gas exit ports. The gas-liquid separator may be utilized in fluid separation systems such as liquid chromatography or supercritical fluid chromatography/extraction systems.

20 Claims, 10 Drawing Sheets

(51) Int. Cl.
  *B01D 15/24* (2006.01)
  *G01N 30/80* (2006.01)
  *G01N 30/84* (2006.01)
  *B01D 15/40* (2006.01)

(52) U.S. Cl.
  CPC ......... *B01D 19/00* (2013.01); *B01D 19/0063* (2013.01); *G01N 30/80* (2013.01); *G01N 30/84* (2013.01); *B01D 15/40* (2013.01)

(56) References Cited

U.S. PATENT DOCUMENTS

| | | |
|---|---|---|
| 2006/0108285 A1 | 5/2006 | Bounoshita et al. |
| 2010/0077874 A1* | 4/2010 | Kanomata .......... B01D 11/0203 73/863.21 |
| 2014/0190890 A1 | 7/2014 | Sidhu et al. |
| 2014/0283688 A1 | 9/2014 | Fogelman et al. |
| 2017/0276654 A1* | 9/2017 | Goto ...................... G01N 30/80 |

FOREIGN PATENT DOCUMENTS

| | | |
|---|---|---|
| CN | 103582515 A | 2/2014 |
| CN | 204767854 U | 11/2015 |
| WO | 2016042618 A1 | 3/2016 |

* cited by examiner

GAS-LIQUID SEPARATOR FOR COLLECTING CHROMATOGRAPHIC FRACTIONS

RELATED APPLICATIONS

This application is the national stage under 35 U.S.C. 371 of International Application No. PCT/US2016/047056, filed Aug. 15, 2016, titled "GAS-LIQUID SEPARATOR FOR COLLECTING CHROMATOGRAPHIC FRACTIONS," the entire contents of which are incorporated herein by reference.

TECHNICAL FIELD

The present invention relates generally to gas-liquid separation and collection of liquid, which may be performed to collect sample fractions separated by liquid chromatography (LC), including supercritical fluid chromatography (SFC) and supercritical fluid extraction (SFE).

BACKGROUND

Liquid chromatography (LC) is a technique for performing an analytical or preparative separation of a liquid-phase sample material of interest (e.g., a mixture of different chemical compounds) into constituent components. During the course of a chromatographic separation, the sample material is transported in a mobile phase (typically one or more solvents). The fluid (mobile phase with the sample material) is forced through a column containing a stationary phase that is immiscible with the mobile phase. Typically, the stationary phase is provided in the form of a mass of particles (a packing or bed) supported in the column between frits that allow the fluid to flow through while retaining the stationary-phase packing in place. Alternatively, in an open tubular configuration the stationary phase is provided in the form of a liner on the inside surface of the column. The respective compositions of the mobile phase and stationary phase are selected to cause different components (fractions) of the sample material (e.g., different chemical compounds) in the column to become distributed between the mobile phase and stationary phase to varying degrees dependent on the respective chemistries of the sample material's components. Components that are strongly retained by the stationary phase travel slowly with the mobile phase, while components that are weakly retained by the stationary phase travel more rapidly. As a result, different fractions (components of differing compositions) become separated from each other as the mobile phase flows through the column, and consequently elute from the column at different times.

Common chromatographic techniques involving liquids include high-performance liquid chromatography (HPLC), ultra-high performance liquid chromatography (UHPLC), supercritical fluid chromatography (SFC), and supercritical fluid extraction (SFE). In SFC and SFE, a non-polar solvent (typically carbon dioxide) is raised in pressure and temperature to or near its critical point. The values of properties of a supercritical fluid, such as density, diffusivity, and viscosity, fall generally between those associated with liquids and gases, which can be advantageous when utilizing a supercritical fluid as a solvent. Hence, in various applications SFC and SFE are considered as combining the advantages of both LC and gas chromatography (GC).

In analytical separation, the components are separated to facilitate their analysis by detection and data acquisition techniques. Analytical separation typically entails the use of a small amount of material and small inside-diameter columns. In preparative separation, the components are separated to purify or isolate one or more chemical components from the starting material, which may be done for a further use such as reaction, synthesis, etc. Purification may be performed on a small scale comparative to analytical separation, or may be performed on a much larger scale to purify a large quantity of sample material, and thus may utilize larger inside-diameter columns.

A fluid separation or extraction process such as LC, SFC, and SFE may entail collecting one or more of the separated fractions from the column effluent. Particularly in the case of SFC and SFE, in which a supercritical fluid is depressurized into an expanding gaseous phase that tends to aerosolize liquid components of the column effluent, collecting fractions with high purity and simultaneously achieving high levels of liquid recovery is a difficult task. The task is often performed with the use of a gas-liquid separator operating at ambient pressure, or with pressurized vessels, which may include a cyclone.

A pressurized separator generally requires a burdensome assembly of structures and components to support the pressurized condition in the vessel and control the exiting gas flow while pressure is maintained inside the vessel. Moreover, the external pressurization structure is prone to blockage in the event the gas-liquid separation is incomplete and sample-containing aerosols accumulate in the structure. Hence, gas-liquid separators that operate at ambient pressure are preferred in that they lessen or eliminate the need for these additional structures and components.

The requirements for purity generally necessitate small liquid volumes with little pooling or intermixing of the fluidic components traversing the separator. Large volumes or pools within a separator allow adjacent fractions, separated within the incoming stream to the separator, to intermix and combine within the separator and thereby destroy the purity of the entering fluid stream. Likewise, adjacent fractions can be held up by liquid coalescence filters or other similar liquid coalescence devices provided by some separators.

Purity can also be affected by the starting and stopping the flow of fluid into the separator. Any liquid retained within the separator, or contained in tubing within conventional separator designs, can cause loss of purity. As the flow of the incoming gas-liquid stream is stopped, the liquid portions of the stream can coalesce within tubing into unique fluidic segments and essentially become trapped within the tubing. If this tubing is utilized used for subsequent collections of different samples, the trapped segments can cause carry-over or contamination, which destroys purity.

When collecting fractions in open containers, the requirements of high liquid recovery relate not only to the gas-liquid separation itself, but additionally to the collection of the liquid in a final collection vessel. If the gas-liquid separation is not complete, gaseous components entrained within the liquid can effervesce. This effect can be dramatic if the level of entrained gas is high and the surface of the pooled liquids is disturbed by the impact of droplets or incoming streams. This impact can lead to bumping, spattering, or other mechanisms of liquid loss and potentially to cross-contamination with nearby collection vessels.

Further, high liquid recovery depends on effectively retaining any aerosolized liquids within the incoming sample stream. Pure flow-through designs relying solely on shape and diameter may not adequately coalesce aerosolized liquid, which may follow centralized paths through the device undisturbed and thus unaffected, thereby leading to loss of sample and reduced recovery.

Conventional separators of the spiral configuration are generally of large physical size. This size is often required when reducing the velocity of the exiting liquid so that it provides minimal interaction with previously collected liquids pooled in collection vessels. Conventional spiral configurations rely on long fluidic channels to remove kinetic energy from the fluid as it traverses the separator. These long channels limit the size and dynamic range of flow rate available to the separator. The size is disadvantageous when desiring to utilize the separator affixed to small bottles, flasks, or other collection vessels. The physical size additionally possesses an inherent mass that is undesirable when used in conjunction with a fast, mobile, robotic assembly such as may be employed in a fraction collector.

Therefore, there is a need for an improved gas-liquid separator that addresses the problems associated with known gas-liquid separators, including gas-liquid separators that receive column effluents produced in supercritical fluid systems. There is also a need for a gas-liquid separator that provides one or more advantages such as, for example, recovery of liquid fractions of high purity, high recovery of liquid fractions, operability at atmospheric pressure, and small physical size.

SUMMARY

To address the foregoing problems, in whole or in part, and/or other problems that may have been observed by persons skilled in the art, the present disclosure provides methods, processes, systems, apparatus, instruments, and/or devices, as described by way of example in implementations set forth below.

According to one embodiment, a gas-liquid separator includes: a fluid inlet; a shell communicating with the fluid inlet, the shell comprising a shell inside surface surrounding a longitudinal axis and enclosing an interior space; an outlet structure comprising a plurality of fingers circumferentially spaced from each other about the longitudinal axis, the fingers converging toward the longitudinal axis and terminating at respective fingertips, and the fingers comprising respective finger inside surfaces generally facing toward the longitudinal axis; a dripper comprising a dripper tip positioned outside of the interior space and a dripper outside surface extending to the dripper tip, wherein the fingertips are proximate to the dripper outside surface; and a gas exit port bounded by the dripper outside surface and two adjacent fingers, wherein: the gas-liquid separator defines a liquid flow path from the fluid inlet, along the shell inside surface, along one or more of the finger inside surfaces, along the dripper outside surface, and to the dripper tip; and the gas-liquid separator defines a gas flow path from the fluid inlet, through the interior space, and through the gas exit port.

According to another embodiment, a fraction collector includes: a movable arm; and a gas-liquid separator according to any of the embodiments disclosed herein, attached to the movable arm.

According to another embodiment, the fraction collector includes a plurality of collection vessels comprising a plurality of openings, wherein the movable arm is configured to move the gas-liquid separator to an alignment position with a selected one of the collection vessels, and at the alignment position the dripper tip is positioned in spatial alignment with the opening of the selected one of the collection vessels. The movable arm may move the gas-liquid separator from one collection vessel to another collection vessel.

According to another embodiment, a fraction collector includes: a gas-liquid separator according to any of the embodiments disclosed herein; and a collection vessel comprising an opening, wherein the dripper tip is positioned in spatial alignment with the opening.

According to another embodiment, the collection vessel comprises a bottle or vessel cap configured for fitting to the opening, and the gas-liquid separator is disposed in the cap.

According to another embodiment, a fraction collector includes: a plurality of collection vessels comprising a plurality of openings; and a plurality of gas-liquid separators according to any of the embodiments disclosed herein, positioned in spatial alignment with the respective openings. The gas-liquid separators may be positioned above the respective openings, in the respective openings, and/or in caps fitted to the respective openings.

According to another embodiment, a supercritical fluid separation system includes: a gas-liquid separator according to any of the embodiments disclosed herein; and a separation column comprising an inlet configured for receiving a mobile phase carrying a sample and an outlet communicating with the fluid inlet of the gas-liquid separator, the separation column configured for separating the sample into different components (e.g., compounds) thereof.

According to another embodiment, the system includes a detector between the separation column and the gas-liquid separator and configured for detecting the different components separated by the separation column.

According to another embodiment, a method for separating a fluid into a liquid and a gas includes: emitting the fluid into an interior space of a gas-liquid separator, the fluid comprising liquid droplets carried in a gas, wherein the liquid droplets begin to separate from the gas in the interior space and coalesce into a liquid stream flowing across an inside surface surrounding the interior space; merging liquid from the liquid stream onto a dripper, wherein the liquid flows across the dripper to the dripper tip and separates from the dripper tip; and while merging the liquid, discharging the gas through one or more gas exit ports adjacent to the dripper.

According to another embodiment, the method includes collecting the liquid separated from the dripper tip in a collection vessel.

According to another embodiment, a method for separating a sample into different components includes: driving a mobile phase containing the sample through a separation column, wherein the column outputs a fluid comprising the mobile phase and different components of the sample separated from each other; and separating the outputted fluid into a liquid and a gas according to any of the embodiments disclosed herein.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

Figure 1:
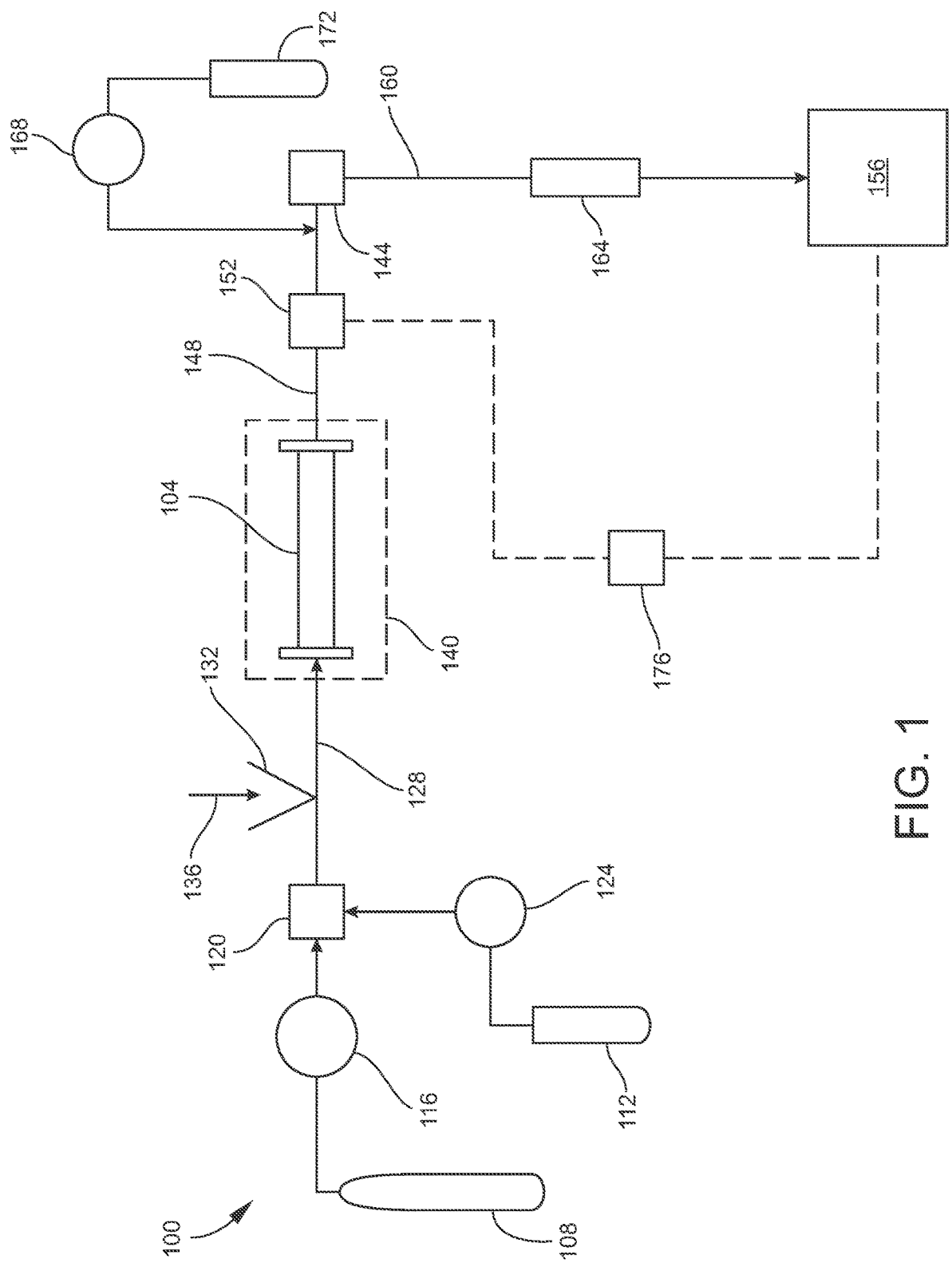
FIG. 1 is a schematic view of an example of a supercritical fluid separation system according to an embodiment disclosed herein.

As used herein, the term "supercritical fluid" refers to a fluid existing in the supercritical state, i.e., a fluid that has reached the supercritical region of the pressure-temperature phase diagram for that (pure) fluid. In other words, a supercritical fluid is at or above a critical pressure and a critical temperature that places the fluid at or above the liquid-vapor critical point corresponding to that (pure) fluid. For example, the liquid-vapor critical point for pure carbon dioxide ($CO_2$) is defined by a critical temperature of 31.04° C. and a critical pressure of 73.8 bar. When in the supercritical state, the fluid cannot exist in either a distinct liquid phase or a distinct gas phase. The fluid may be brought into its supercritical state through the operation and control of an appropriately configured supercritical fluid handling system such as, for example, a supercritical fluid chromatography (SFC) system or a supercritical fluid extraction (SFE) system. For convenience, unless specified otherwise or the context dictates otherwise, the term "supercritical fluid" also encompasses a "near-supercritical" fluid, i.e., a fluid existing in a dense, high pressure state near the critical temperature and/or critical pressure. A near-supercritical fluid is at a pressure and/or temperature that places the fluid outside of, but near to, the supercritical region of the pressure-temperature phase diagram for that fluid. A near-supercritical fluid may be, for example, a mixture of a liquid and a highly compressed gas (e.g., at a pressure of 50 bar or greater) at a temperature less than the critical temperature demarcating the supercritical phase. The near-supercritical state of the fluid may be due to, for example, an operation of the supercritical fluid handling system or the addition of a different material to the fluid.

As used herein, the term "primary solvent" (or "first solvent") refers to a solvent utilized as a mobile phase fluid in a supercritical fluid-based separation system (e.g., an SFC or SFE system) such as disclosed herein, and which may attain the supercritical state through operation of such a system. In SFC usage, the primary solvent is often a non-polar compound, and thus may also be referred herein as a non-polar solvent. A typical example of a primary solvent is carbon dioxide ($CO_2$), as its critical point is easy to reach relative to other solvents. Other examples of fluids that may be utilized as a primary solvent include, but are not limited to, nitrous oxide ($N_2O$), and certain alkanes such as ethane ($C_2H_6$), propane ($C_3H_8$), n-butane ($C_4H_{10}$), and pentane ($C_5H_{12}$). Depending on where the primary solvent is located in the associated system or the operating state of the system, the primary solvent may or may not be in the supercritical state at a given instant of time.

As used herein, the term "line" or "fluid line" generally refers to a fluid conduit of any type (e.g., tube, pipe, channel, etc.) capable of containing a volume of fluid and providing a path for the fluid to flow from one end of the line to the other end of the line. Such a fluid line should have a pressure rating suitable for use in a supercritical fluid separation system as described herein, and typically is inert to (does not chemically react with or sorb) the fluid contained in the fluid line. A fluid line may include two or more distinct segments. For example, one or more fluidic devices or structures (e.g., pumps, valves, sensors, unions, flow combiner, flow splitters, flow cells, heaters, coolers, chambers, separation columns, etc.) may be part of, or in communication with, the fluid line at one or more positions between the two ends of the fluid line.

As used herein, the term "wettable surface" refers to a solid surface that interacts with liquid in a manner that causes the liquid to spread across the wettable surface, due to adhesive forces between the liquid and the wettable surface being high relative to the cohesive forces within the liquid. Generally, wetting may be considered to be high when the contact angle ($\theta$) for a liquid droplet on a solid surface—i.e., the angle at which the liquid—vapor interface meets the solid-liquid interface—is in a range from 0° to 90°, with 0° corresponding to perfect wetting (i.e., a liquid spread flat on a solid surface). The term "wettable surface" may be used interchangeably with the term "hydrophilic surface," although the term "hydrophilic" specifically relates to a case where the liquid is water.

As used herein, the term "non-wettable surface" refers to a solid surface that interacts with liquid in a manner that allows the liquid to maintain a compact droplet-like shape and minimizes the area of contact between the liquid and the non-wettable surface, due to adhesive forces between the liquid and the wettable surface being low relative to the cohesive forces within the liquid. Generally, wetting may be considered to be low when the contact angle ($\theta$) is in a range from 90° to 180°, with 180° corresponding to perfect non-wetting (i.e., a spherical droplet on a solid surface). The term "non-wettable surface" may be used interchangeably with the term "hydrophobic," although the term "hydrophobic" specifically relates to a case where the liquid is water.

The degree of wettability of the surface of a solid object (i.e., the condition of the surface being wettable or non-wettable) may be an inherent property of the bulk material of the solid object. Alternatively, the degree of wettability of the surface may be modified by subjecting the surface to an appropriate surface treatment (e.g., chemical treatment, plasma treatment, super-hydrophobicity etc.), or applying a coating (film, layer, etc.) having an appropriate composition to the surface, as appreciated by persons skilled in the art. Therefore, as used herein, a wettable or non-wettable "surface" encompasses a surface that has been treated (e.g., modified or functionalized) or coated to increase or decrease its wettability.

FIG. 1 is a schematic view of an example of a supercritical fluid-based separation system, or more simply a supercritical fluid separation system 100, according to an embodiment. In the present example the system 100 is primarily representative of an SFC system, although alternatively the system 100 may be another type of supercritical fluid separation system such as an SFE system. The structure and operation of various supercritical fluid separation systems are generally understood by persons skilled in the art, and thus the system 100 will be described only briefly as necessary for understanding the presently disclosed subject matter. Generally, the system 100 may be configured for analytical chromatography (or extraction) or preparative chromatography (or extraction). The system 100 may be configured for isocratic elution or gradient elution, and may be switchable between these two modes of operation.

The system 100 is configured to establish a flow of a mobile phase into and through a fluid separation column 104 (e.g., a chromatography column or extraction cell). The mobile phase includes a primary (or first) solvent as described above, which typically serves as a non-polar, "weak" solvent. To modify (increase) the polarity of the mobile phase, the mobile phase may also include a polar co-solvent (also referred as a "modifier" solvent) that serves as a "strong" solvent. In the context of the present disclosure, a "weak" solvent is one for which a sample component has relatively lesser affinity as compared to the stationary phase in the column 104, and a "strong" solvent is one for which the sample component has relatively greater affinity as compared to the stationary phase. Thus, a sample component carried in a higher proportion of weak solvent will be strongly retained on the stationary phase, resulting in a longer time of elution from the column 104. By comparison, a sample component carried in a higher proportion of strong solvent will be weakly retained (or not retained at all) on the stationary phase, resulting in a shorter time of elution from the column 104. The mobile phase composition—i.e., the relative compositions of the primary solvent (the weak solvent) and the modifier solvent (the strong solvent) in the mobile phase—will generally depend on the sample being processed and the method protocol being implemented. During a given experiment, the mobile phase composition may be constant (isocratic elution) or varied (gradient elution) over time. The modifier solvent is typically an organic solvent. Examples of modifier solvents include, but are not limited to, alcohols such as methanol (MeOH), ethanol (EtOH), and isopropyl alcohol (IPA); or other polar solvent such as acetonitrile (ACN), or mixtures thereof. The modifier solvent may also contain additional solvent components (termed additives) such as water, amines, acids, etc. used to modify the chemical properties of the solvent (such as pH) affecting the separation.

To provide the mobile phase, the system 100 may include a first solvent source 108 for supplying the primary (or first) solvent and a second solvent source 112 for supplying the modifier (or second) solvent. The solvent sources 108 and 112 may be tanks, reservoirs, or other containers. The system 100 may further include a first pump 116 for establishing a flow of the primary solvent from the first solvent source 108 to a mixer 120, and a second pump 124 for establishing a flow of the modifier solvent from second solvent source 112 the to the mixer 120. Examples of pumps include, but are not limited to, single-piston or multiple-piston pumps, metering pumps, gear pumps, syringe pumps, diaphragm pumps, etc, or combinations (series and/or parallel) thereof. The first pump 116 is configured for pressurizing the primary solvent to a dense, high pressure level, possibly above the solvent's critical point. When utilizing a primary solvent that exists as a gas at low temperature (e.g., room temperature) and low pressure, as in the common example of carbon dioxide, the first pump 116 may include a pump chiller and other components specifically needed for maintaining the highly compressible primary solvent in a liquid phase so that the primary solvent can be pumped effectively. The system 100 may also include a cooling device (e.g., a heat exchanger, not shown) in thermal contact with the primary solvent delivery line upstream of the first pump 116 to condense an initially gaseous primary solvent into the liquid phase. The mixer 120 generally may be any fluidic component effective for merging the incoming flows of the primary solvent and the modifier solvent into a single flow of a solvent mixture. In some embodiments the mixer 120 may be a basic flow combiner such as a T-connection (or Y-connection) for simply joining two flowstreams. In other embodiments the mixer 120 may be configured for providing an enhanced mixing effect to achieve a level of homogeneity desired for a particular application, such as by having a certain length, volume, geometry, and/or structural features.

In some applications, the mobile phase driven through the column 104 may include more than two solvents. Accordingly, the illustrated second solvent source 112 may represent two or more solvent sources supplying different solvents. The two or more solvent sources generally communicate with separate pumping systems. Alternatively, a proportioning valve may be utilized to route flows from one or more selected solvent sources and in selected proportions to a single pump (e.g., the second pump 124), as appreciated by persons skilled in the art.

The mobile phase, comprising the primary solvent or a mixture of the primary solvent and one or more co-solvents, is transported from the mixer 120 into the column 104 via an inlet line 128 communicating with the inlet of the column 104. In some embodiments, system 100 may include a pre-heater (not shown) positioned in thermal contact with the inlet line 128 to heat the mobile phase prior to entering the column 104.

The system 100 may further include a sample injector (or sample introduction device) 132 exemplarily communicating with the inlet line 128. The sample injector 132 is configured for injecting a sample 136 into the mobile phase, whereby the sample 136 is carried by (e.g., dissolved in) the mobile phase and thus driven with the mobile phase into the column 104. It is understood that the positioning of a sample introduction device may be located at other positions upstream of column 104 including fluidic line(s) entering the mixer 120 or amongst or within various bypass, or diversion lines containing mobile phase or mobile phase components. As one non-limiting example and as appreciated by persons skilled in the art, the sample injector 132 may include a multi-port injection valve switchable into fluid communication with the inlet line 128, a syringe pump or metering pump (or other positive displacement pump), a sample loop, and a waste receptacle. The injection valve may include a stationary portion containing internal passages (or grooves) and a movable (rotary or linear) portion containing external ports. The movable portion may be movable in an indexed manner to a plurality of valve positions, and the movement may be powered by a stepper motor. Typically, at each valve position, two of the external ports are placed in fluid communication with one of the internal passages. Thus, selecting different valve positions enables selecting different pairs of ports to serve as a fluid inlet and outlet, thereby selecting different fluid pathways between components external to the injection valve that are in fluid communication with the ports. Two of the ports may communicate with the sample loop. The injection valve may be switchable to a plurality of different valve positions such as, for example, a sample load position, a sample injection position, a rinse position, etc., as appreciated by persons skilled in the art.

The sample 136 may be injected into the mobile phase as a liquid, and may be a solution in which sample material is dissolved in a sample solvent.

The column 104 generally may be any column suitable for high-pressure chromatography. The column 104 includes a stationary phase comprising a material effective for chromatographic separation, which may be provided in the form of a packing in the column 104 (i.e., a packed column) or a liner inside the column 104 (i.e., an open tubular column) as appreciated by persons skilled in the art. As the mobile phase carrying the sample is driven through the column 104, different fractions of the sample become separated from each other due to different degrees of interaction with the stationary phase. The separated fractions thus elute with the mobile phase from the column 104 at different times. To adjust the temperature of the mobile phase, the above-noted pre-heater may be utilized. Similarly, the temperature of the column 104 may be may be adjusted by positioning in thermal contact with a heating device 140 such as an oven or a heating jacket.

The column effluent (i.e., the mobile phase and separated fractions) operatively flow to one or more detectors 152 via the outlet line 148. The detector(s) 152 may be positioned along fluid outlet line 148 as shown, or may alternatively (not shown) be configured to utilize a diverted (also termed split) portion of column effluent from outlet line 148 as known to those of skill in the art. Detectors 152 are configured for detecting the compounds of the original sample 136 as they elute from the column 104. The detectors 152 output electronic signals indicative of the detected compounds. The detector signals may be utilized to control the downstream fraction collection process described below, as well as to provide analytical data to the user (e.g., a chromatogram, such as a plot of signal intensity as a function of time). When connected in series with the flow stream as shown, detectors 152 are of the non-destructive type to enable the fractions to be collected after detection. One typical example is an optical-based (e.g., absorbance) detector that includes a flow cell through which the column effluent passes, a light source that irradiates the fluid in the flow cell with a light beam propagating in the ultraviolet (UV), visible (Vis), or infrared (IR) range, and an optical detector (e.g., diode array) that measures the light emitted from the flow cell in response to the irradiation. Other examples of detector 152 may include a chiral (optical activity) detector configured to detect separate enantiomers of chiral compounds or destructive detectors which must be split from fluid outlet line 148 such as a mass spectrometer (MS) or a flame ionization detector (FID), etc. The temperature of the mobile phase fluids may be adjusted after exiting column 104 with the optional inclusion of a post-column heater (not shown) positioned on outlet line 148.

To maintain the mobile phase at a high pressure (and thus density) (e.g., in a range from 90 bar to over 600 bar), in the column 104 or at any detectors 152, the pressure at the outlet of the column 104 is controlled by a flow stream restrictor such as a back-pressure regulator (BPR) 144 positioned in an outlet line 148 communicating upstream with the outlet of the column 104. Back pressure regulators, such as one used herein, may experience significant cooling from the expanding fluid and are known to incorporate heaters to reduce this thermal effect.

The column effluent flows from the back pressure regulator 144 to a fraction collector 156 via a transfer line 160. The column effluent is generally depressurized after it exits the BPR 144. Consequently, the primary solvent transitions from a dense, high pressure, state to the gas phase, as the mobile phase further expands. The volume of the gaseous primary solvent may be hundreds of times greater than the volume the primary solvent had in its previously highly pressurized state. Due to the depressurization, the column effluent becomes bi-phasic, comprising the gaseous primary solvent and a much smaller amount (by volume) of aerosolized liquid solution, which contains one or more solvents (sample injection solvent(s), modifier solvent(s) and their additive(s), if utilized) in which the sample fractions are dissolved. The evaporating and expanding primary solvent aerosolizes the liquid solution, and the resulting liquid droplets are interspersed in the flow of the gaseous primary solvent. The process of evaporation and expansion cools the column effluent. The system 100 may include a heating device 164 positioned downstream from the BPR 144 in thermal contact with the transfer line 160 to restore at least some of the heat lost. In addition, the system 100 may include a make-up fluid pump 168 that adds a flow of make-up fluid from a make-up fluid reservoir 172 into the flow of column effluent in the transfer line 160, at a fluidic junction either downstream from the BPR 144 or preferably between the column 104 and the BPR 144 (as illustrated). The make-up fluid may be, for example, an organic solvent such as described above.

The fraction collector 156 is configured for collecting one or more selected fractions of the column effluent that have been separated by the column 104. Generally, the fraction collector 156 includes one or more gas-liquid separators, fraction collection vessels, waste receptacles, and fluid handling components for routing the column effluent from the transfer line 160 to the gas-liquid separator(s) or waste receptacle(s). Examples of fraction collectors in accordance with embodiments disclosed herein are described below.

The system 100 may also include a system controller (e.g., computing device) 176. The system controller 176 may schematically represent one or more modules (or units, or components) configured for controlling, monitoring and/or timing the operation of various components of the system 100 such as, for example, fluid pumps 116, 124, and 168; sample injector 132; heating devices 140 and 164; BPR 144; fraction collector(s) 156; valves; sensors (pressure, temperature, flow rate, etc.); etc. For such purposes, the system controller 176 may be in signal communication with various components of the system 100 via wired or wireless communication links, as partially represented in FIG. 1 by dashed lines between the system controller 176 and the BPR 144 and between the system controller 176 and the fraction collector 156. Also for such purposes, the system controller 176 may include one or more types of hardware, firmware and/or software, as well as one or more memories and databases. One or more modules of the system controller 176 may be, or be embodied in, for example, a computer workstation or desktop computer, or a mobile computing device such as a laptop computer, portable computer, tablet computer, handheld computer, personal digital assistant (PDA), smartphone, etc. The system controller 176 may also include or communicate with various user input devices (e.g., keyboard, keypad, touch screen, mouse, joystick, trackball, light pen, other pointing devices, microphone, etc.) and user output devices (e.g., display screen, printer, visual indicators such as lamps or light-emitting diodes LEDs, audible indicators such as loudspeakers, klaxons, sirens, etc.). The system controller 176 may include one or more reading devices on or in which a non-transitory (tangible) computer-readable (machine-readable) medium may be loaded that includes instructions for performing all or part of any of the methods disclosed herein.

It will be understood that while the system 100 has been described thus far primarily in the context of an SFC system, the system 100 may alternatively be configured as, or in conjunction with, another type of supercritical fluid separation system. For example, the system 100 may be configured as or include components of an SFE system. In such a case, the sample injector 132 may or may not be included. That is, the column 104 may be configured as an extraction cell that may be decoupled manually or through the use of automated valving from the system 100 to enable the sample 136 to be loaded directly into the cell and selectively extracted from an extraction cell. Further, effluent from an extraction cell may be subsequently directed into the column 104 for chromatographic separation of extracted analytes. The sample 136 may be a solid or a liquid in this case.

Figure 2:
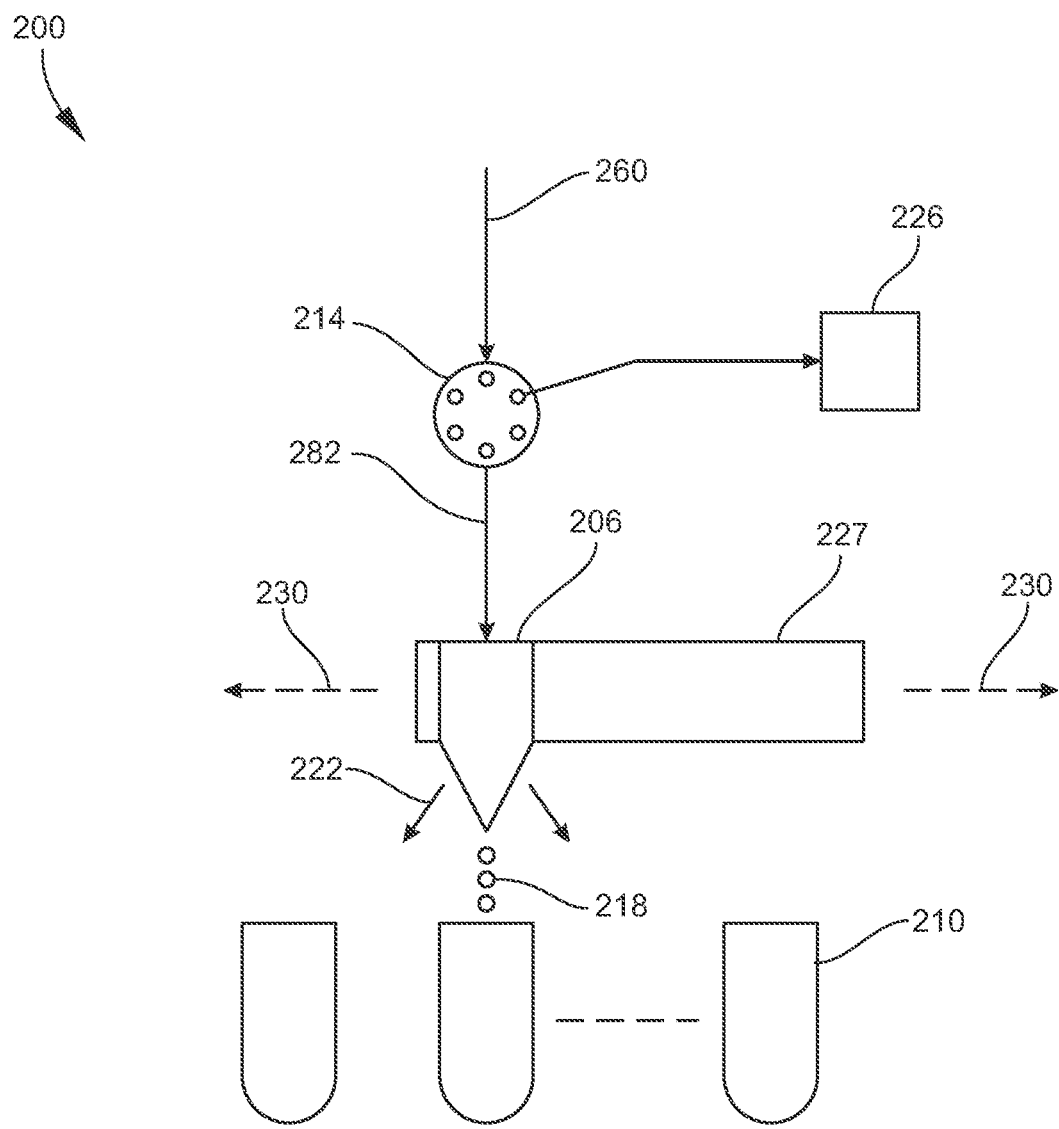
FIG. 2 is a schematic view of an example of a fraction collector according to an embodiment disclosed herein.

FIG. 2 is a schematic view of an example of a fraction collector 200 according to an embodiment. The fraction collector 200 may be utilized in a system such as described above and illustrated in FIG. 1, and thus may correspond to the fraction collector 156 of the system 100. The fraction collector 200 includes a gas-liquid separator 206 and one or more fraction collection vessels 210, and may further include a flow-selecting (or flow-switching) device 214. Column effluent flows to the fraction collector 200 via a transfer line 260, which may correspond to the transfer line 160 shown in FIG. 1. The gas-liquid separator 206 is configured to separate the liquid from the gas of the column effluent, as described herein. The liquid travels to the bottom of the gas-liquid separator 206 and exits as droplets 218, which flow by gravity into the fraction collection vessel 210. The gas is vented to the ambient via one or more gas outlet ports, as indicated by arrows 222.

The flow-selecting device 214 is configured for switching the flow path of the column effluent either to the gas-liquid separator 206 via a fluid line 282 or to another fluid destination site 226 via another fluid line. The flow-selecting device 214 may include, for example, a multi-port fluidic valve with two or more switchable flow passages as described above in conjunction with the sample injector 132 of FIG. 1. The switching state and timing of the flow-selecting device 214 may be controlled by a controller such as the system controller 176 described above, and may be based on signals output by a detector such as the detector 152 described above. For example, in response to the detector 152 detecting the presence of a particular compound in the column effluent, the controller 176 may switch the flow-selecting device 214 (at an appropriate point in time) to a position or state that directs the column effluent to the gas-liquid separator 206 so that the fraction can be collected in the fraction collection vessel 210 with which the gas-liquid separator 206 is operatively aligned. Upon no longer detecting the compound at the detector 152, or after a predetermined period of time, or upon detecting that a predetermined maximum volume of liquid has been collected (such as by utilizing an appropriate sensor, or calculated from liquid pumping rates), the controller 176 may then switch the flow-selecting device 214 to a position or state that directs the column effluent to the other fluid destination site 226. Other fluid destination sites 226 may comprise waste receptacles, or one or more subsequent fraction collectors which, along with fraction collector 200, may be connected serially or by valving arrangements known in the art. Such subsequent fraction collectors may operatively function as extensions of fraction collector 200 being under control and in communication with the controller 176.

In the present embodiment, the fraction collector 200 has a series configuration that includes a single gas-liquid separator 206 and a plurality of fraction collection vessels 210 arranged in a one-dimensional or two-dimensional array. The fraction collector 200 further includes a movable arm 227 to which the gas-liquid separator 206 is mounted. The movable arm 227 is configured for moving the gas-liquid separator 206 into alignment over the opening of any selected one of the fraction collection vessels 210, and may move the gas-liquid separator 206 from one fraction collection vessel 210 to another in series, as indicated by arrows 230. For this purpose, the movable arm 227 may be movable in one, two, or three (X-Y-Z or equivalent) dimensions. The movable arm 227, and the selection of a fraction collection vessel 210, may be controlled by the controller 176 (FIG. 1). The movable arm 227 may be the end effector of a robot operating with motor-driven stages, which may be controlled by the controller 176, as appreciated by persons skilled in the art. The selection of which fraction collection vessel 210 is to receive liquid droplets 218 from the gas-liquid separator 206 at any given time may be automated according to a preprogrammed itinerary executed by the controller 176, or according to decisions made by the controller 176 in response to events occurring during a given experimental run of the system 100, or in response to a user command. For example, the gas-liquid separator 206 may be positioned by the movable arm 227 at one fraction collection vessel 210 to deposit a liquid fraction therein, then moved by the movable arm 227 to another fraction collection vessel 210 to deposit a different liquid fraction therein, and so on. This fraction collection process may be repeated for subsequent iterations of sample injection and separation. For example, the same type of fraction (e.g., the same chemical compound) separated in subsequent iterations may be deposited into the same fraction collection vessel 210, whereby different fractions from multiple injections/separations may be accumulated (pooled) into respective fraction collection vessels 210. As another example, two or more of the fraction collection vessels 210 may be utilized to collect a large quantity of a target fraction separated or extracted from multiple injections/separations.

Figure 3:
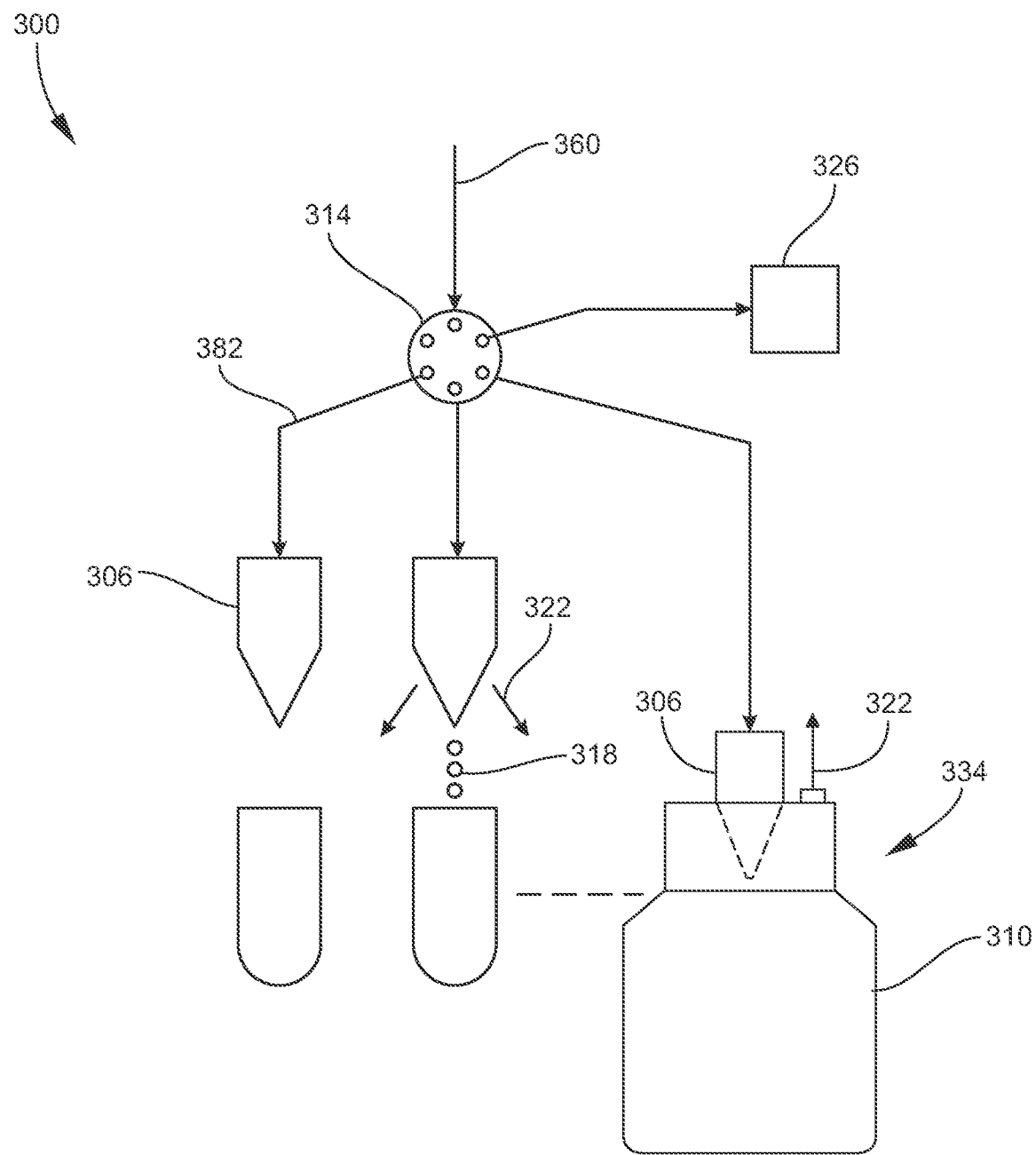
FIG. 3 is a schematic view of an example of a fraction collector according to another embodiment disclosed herein.

FIG. 3 is a schematic view of an example of a fraction collector 300 according to another embodiment. The fraction collector 300 may be utilized in a system such as described above and illustrated in FIG. 1, and thus may correspond to the fraction collector 156 of the system 100. In the present embodiment, the fraction collector 300 has a parallel configuration that includes a plurality of gas-liquid separators 306 and a plurality of fraction collection vessels 310, and may further include a flow-selecting (or flow-switching) device 314. Each gas-liquid separator 306 is positioned in spatial alignment over a respective fraction collection vessel 310. In some embodiments, a gas-liquid separator 306 may be integrated with or mounted in a cap 334 of a fraction collection vessel 310, as depicted by the right-most gas-liquid separator 306/fraction collection vessel 310 illustrated in FIG. 3. Column effluent flows to the fraction collector 300 via a transfer line 360, which may correspond to the transfer line 160 shown in FIG. 1. The gas-liquid separators 306 are configured as described elsewhere herein, producing liquid droplets 318 separated from gas streams that are vented to the ambient as indicated by arrows 322. In the case of the right-most gas-liquid separator 306/fraction collection vessel 310 illustrated in FIG. 3, the cap 334 may include one or more vents for venting the gas.

The flow-selecting device 314 is configured for switching the flow path of the column effluent to a selected one of the gas-liquid separators 306 via a corresponding fluid line 382 or to another fluid destination site 326 via another fluid line. The other fluid destination site 326 may be a waste receptacle or one or more subsequent fraction collectors. Alternatively, flow-selecting device 314 may utilize passages, interspersed with fluid lines 382, being directed to or pooled into other fraction destination sites 326. The flow-selecting device 314 may include, for example, a multi-port fluidic valve as described elsewhere herein. Generally, the fraction collector 300 may operate in a manner similar that described above in relation to the fraction collector 200 of FIG. 2. The flow-selecting device 314 may be controlled by a controller and may be based on feedback signals outputted by a detector as described elsewhere herein. For example, the flow-selecting device 314 may be switched to sequentially establish flow paths directed to the respective gas-liquid separators 306 to enable different fractions detected by the detector 152 to be collected in respective fraction collection vessels 210. In some applications, it may be considered advantageous that each gas-liquid separator 306 processes only one type of sample fraction, as cross-contamination between different fractions may be avoided. As in the embodiment of FIG. 2, the fraction collection process may be repeated for subsequent iterations of sample injection and separation. Moreover, two or more of the fraction collection vessels 310 may be utilized to collect a large quantity of a target fraction separated or extracted from multiple injections/separations.

It will be understood that FIGS. 1 to 3 are high-level schematic depictions of a supercritical fluid separation system 100 and associated fraction collectors 156, 200, and 300. As appreciated by persons skilled in the art, other components may be included as needed for practical implementations.

Figure 4:
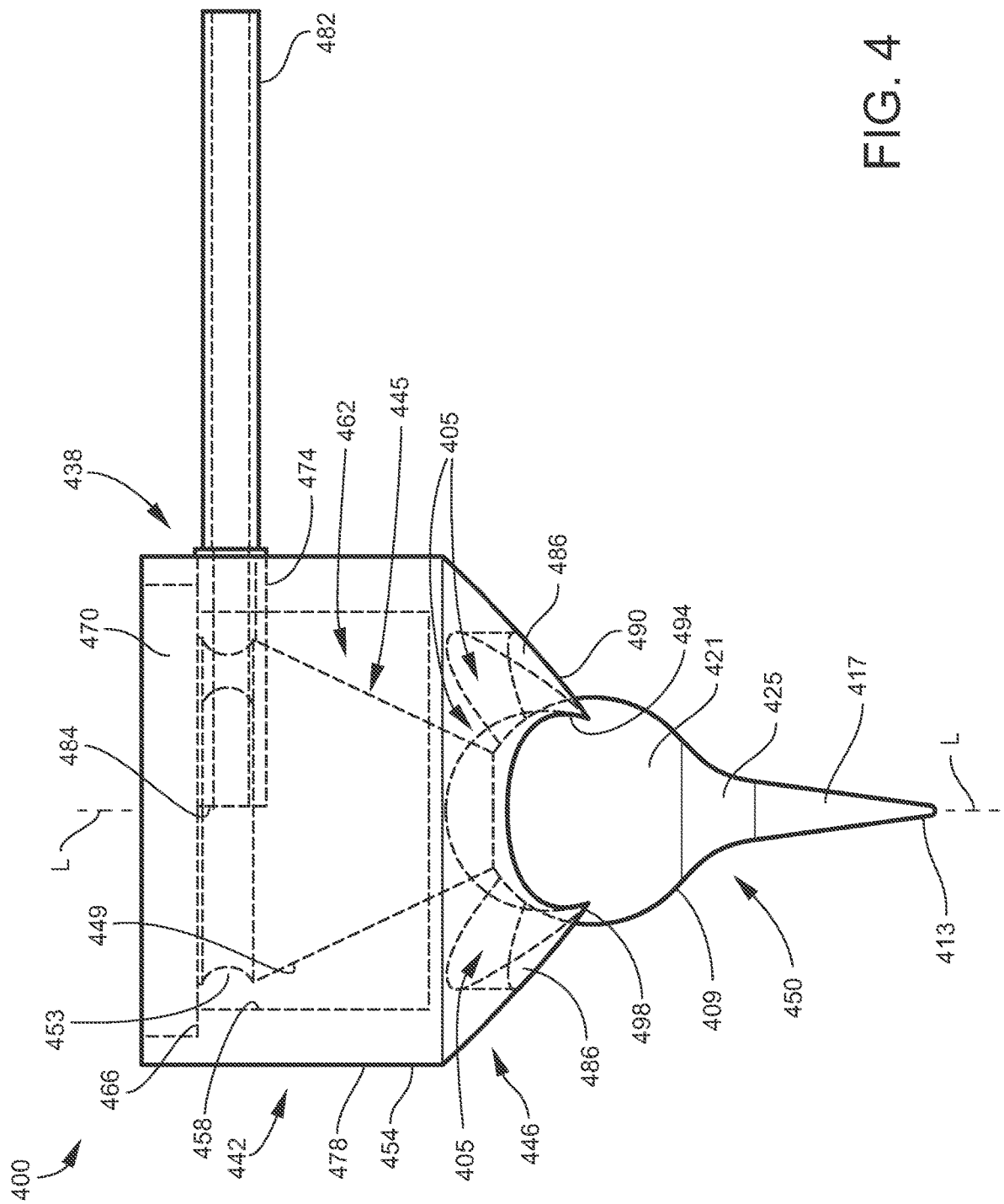
FIG. 4 is an elevation view of an example of a gas-liquid separator in assembled form, according to an embodiment disclosed herein.
Figure 5:
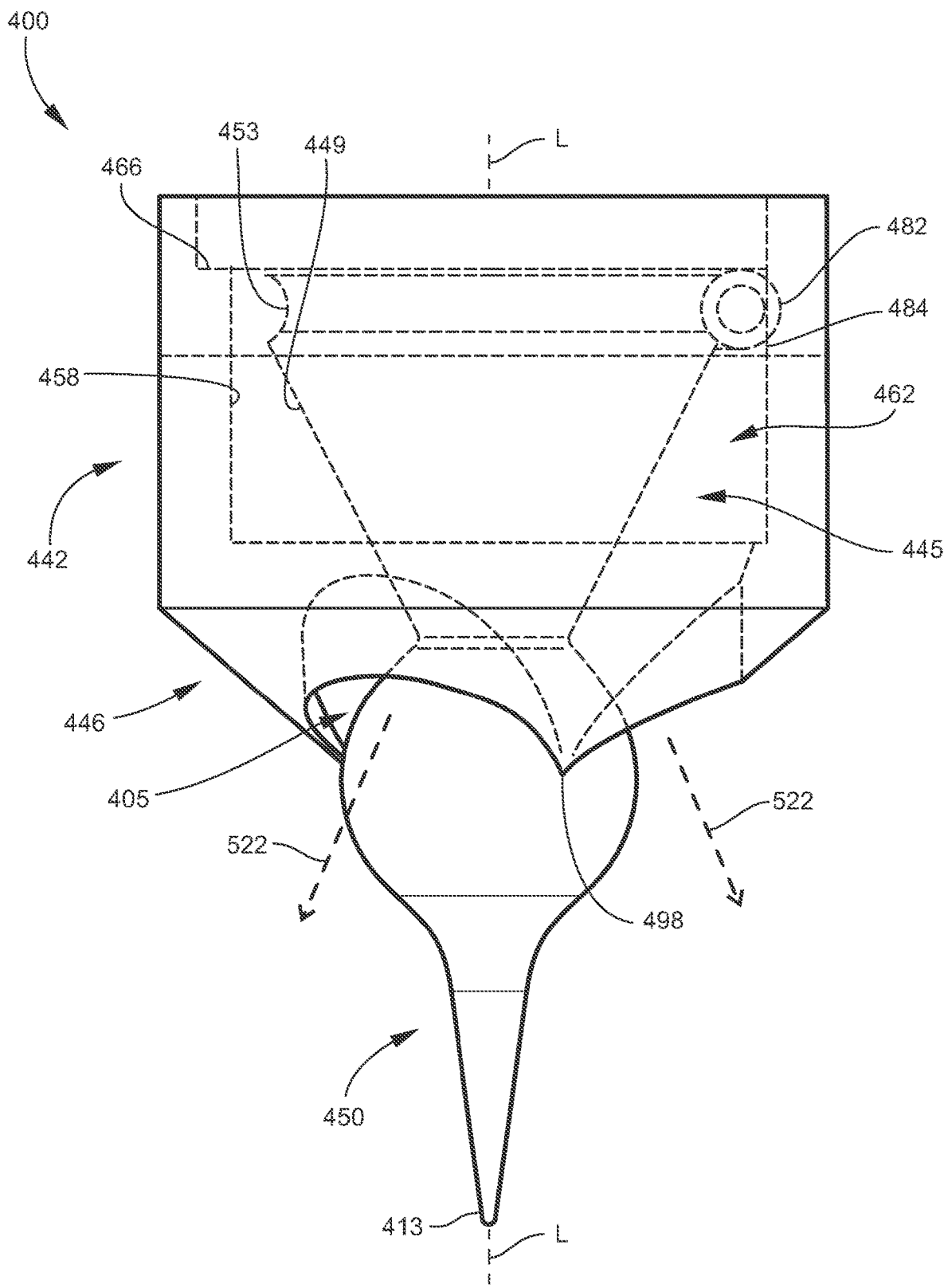
FIG. 5 is another elevation view of the gas-liquid separator illustrated in FIG. 4, with the gas-liquid separator rotated about a longitudinal axis L relative to the view shown in FIG. 4.
Figure 6:
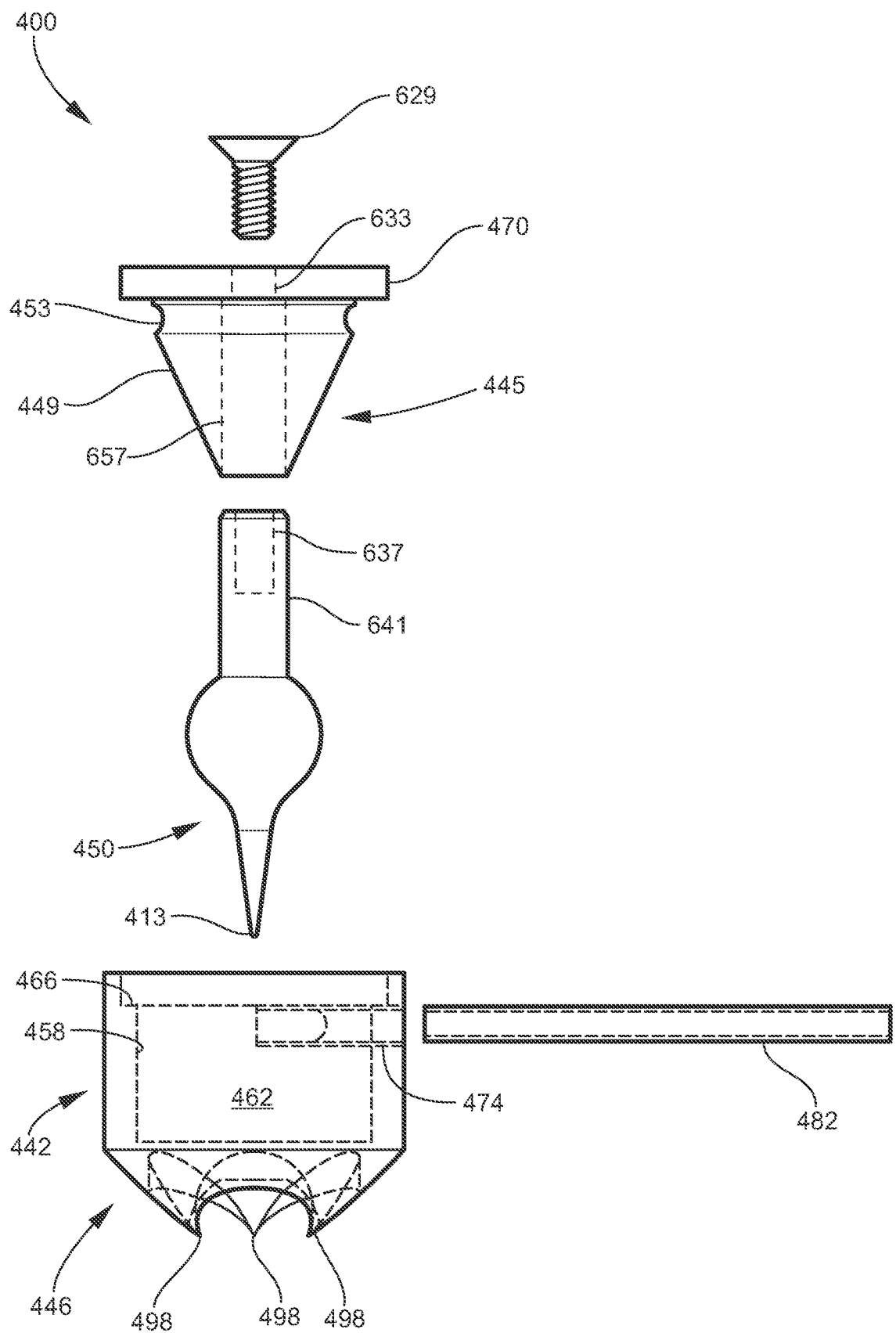
FIG. 6 is an exploded elevation view of the gas-liquid separator illustrated in FIGS. 4 and 5, i.e., in unassembled form.

FIG. 4 is an elevation view of an example of a gas-liquid separator 400 in assembled form, according to an embodiment disclosed herein. FIG. 5 is another elevation view of the gas-liquid separator 400 illustrated in FIG. 4, with the gas-liquid separator 400 rotated about a longitudinal axis L relative to the view shown in FIG. 4. FIG. 6 is an exploded elevation view of the gas-liquid separator 400 illustrated in FIGS. 4 and 5, i.e., in unassembled form. In these Figures, some internal features of the gas-liquid separator 400 are indicated by dashed lines.

In this embodiment, the gas-liquid separator 400 includes a fluid inlet 438, a shell 442 communicating with the fluid inlet 438, an outlet structure 446 communicating with the shell 442, and a dripper 450 communicating with the outlet structure 446. These components cooperatively function to induce gas-liquid separation of a fluid (e.g., column effluent) supplied to the fluid inlet 438, and to provide one or more liquid paths for liquid to travel out from the gas-liquid separator 400 and one or more gas paths for gas to travel out from the gas-liquid separator 400. For reference purposes, FIG. 4 shows a longitudinal axis L passing through the gas-liquid separator 400. Components of the gas-liquid separator 400 may be considered as being positioned along or relative to the longitudinal axis L.

The shell 442 includes a main body 454 of solid material. The main body 454 includes a cylindrical shell inside surface 458 coaxial with the longitudinal axis L. The shell inside surface 458 coaxially surrounds (encloses) and at least partially bounds (defines) an interior space 462. The shell inside surface 458 transitions to an annular shoulder 466 that defines an upper opening or pocket having a larger inside diameter than that of the shell inside surface 458 (see also FIG. 7, described below). In assembled form, a plate (or flange, lid, cover, etc.) 470 is disposed on the annular shoulder 466 such that the plate 470 lies in a plane transverse to the longitudinal axis L, thereby closing off the interior space 462 from above the interior space 462. That is, the interior space 462 is bounded by the plate 470 as well as the shell inside surface 458. A sealing element such as an O-ring or gasket (not shown) may be included to provide a sealing interface between the upper opening and the plate 470, or components may be held tightly together using a crimp ring, clamping device, etc. The lower end of the interior space 462 is in open communication with the outlet structure 446, described below.

The fluid inlet 438 includes an inlet bore 474 formed through the main body 454 along a direction orthogonal to the longitudinal axis L, i.e., along the horizontal direction from the perspective of FIGS. 4 and 5. Alternatively, the inlet bore 474 may be oriented at an angle to the horizontal direction. The inlet bore 474 extends from a shell outside surface 478 to the shell inside surface 458. A fluid entry tube 482 is inserted through the inlet bore 474 until the open distal end of the fluid entry tube 482 contacts a stop 484 located within main body 454. The stop 484 may comprise a feature (exemplary shown as a bore or a pocket) located within shell main body 454 and tangential to the shell inside surface 458 and axially aligned with inlet bore 474, and to a distance sufficient to make interfering contact with the wall of the fluid entry tube 482 without obstructing the distal opening of the inner bore of the fluid entry tube 482. The fluid entry tube 482 thus communicates with the interior space 462. The interference between the stop 484 and the distal end of the fluid entry tube 482 is further shown in FIG. 5 in which, in comparison to the view of FIG. 4, the gas-liquid separator 400 has been rotated about the longitudinal axis L to a position at which the fluid entry tube 482 is behind the shell 442. The fluid entry tube 482 may be part of, or be fluidly coupled to, a fluid line that supplies fluid to the gas-liquid separator 400 such as, for example, the transfer line 160, 260, or 360 shown in FIGS. 1-3, respectively, or the fluid line 282 between the flow-selecting device 214 and gas-liquid separator 206 shown in FIG. 2, or one of the fluid lines 282 between the flow-selecting device 314 and corresponding gas-liquid separator 306 shown in FIG. 3. In some embodiments, the flow rate of a pumped fluid conducted into the gas-liquid separator 400 via the fluid inlet 438 is on the order of milliliters per minute (mL/min). As one non-limiting example, the flow rate, as metered by the pumps, may be in a range from about 2 mL/min to about 10 mL/min, although examples of flow rate may be less than or significantly greater than the foregoing range. In some embodiments, the fluid entry tube 482 has an inner diameter in a range from a fraction of a millimeter (mm) to a few millimeters, although in other embodiments the inner diameter of the fluid entry tube 482 may be larger.

The outlet structure 446 generally is an open structure axially adjacent to the main body 454 and extending downward from the bottom of the main body 454, and has a profile that tapers generally toward the longitudinal axis L. The outlet structure 446 may be adjoined to the main body 454 such that the outlet structure 446 and the main body 454 may be integral with each other. For instance, the outlet structure 446 and the main body 454 may be fabricated as a monolithic or single-piece construction, for example by employing the same molding or machining process (depending on the material(s) of the outlet structure 446 and the main body 454). Alternatively, the outlet structure 446 may be fabricated separately from the main body 454 and subsequently attached to the main body 454 by an appropriate bonding means (e.g., adhesion, fusion, welding, etc.) or mechanical means (e.g., fastening, clamping, etc.). Depending on the embodiment, the outlet structure 446 may or may not be considered as being a part of the shell 442.

The outlet structure 446 includes an inside surface generally facing toward the longitudinal axis L (at an angle thereto) and an outside surface generally facing away from the longitudinal axis L (at an angle thereto). The body of the outlet structure 446 is configured to form (define) a plurality of fingers 486 circumferentially spaced from each other about the longitudinal axis L. The fingers 486 may have a tapered or pointed shape defined by at least portions of the outside and inside surfaces of the outlet structure 446, which are referred to herein as finger outside surfaces 490 and finger inside surfaces 494. As illustrated, the fingers 486 converge toward the longitudinal axis L (in a resultant direction having both vertical and horizontal components) and terminate at respective fingertips 498. The profile lines defining the convergence may be straight (e.g., as a straight conical geometry) or may be curved (as illustrated). The fingertips 498 may be appreciably sharp (e.g., as apices) but are not required to be. That is, the shape of the fingertips 498 may be blunter than the shape suggested by the schematic views of FIGS. 4-6, and/or the distal-most ends of the fingertips 498 may comprise flat or fitted faces. In the illustrated embodiment, the outlet structure 446 includes a total of three fingers 486 and the fingertips 498 are spaced 120 degrees from each other about the longitudinal axis L, as best shown in FIG. 6 (see also FIGS. 7 and 8, described below). In other embodiments the outlet structure 446 may include fewer or more than three fingers 486.

The outlet structure 446 further includes a plurality of gas exit ports 405 communicating with the interior space 462. The gas exit ports 405 are circumferentially spaced from each other about the longitudinal axis L. Each gas exit port 405 is defined between two adjacent fingers 486. In the illustrated embodiment, with a total of three fingers 486 the outlet structure 446 includes a total of three gas exit ports 405. In other embodiments the outlet structure 446 may include fewer or more than three gas exit ports 405. The fingers 486 and the gas exit ports 405 are also shown in the respective top and bottom plan views of FIGS. 7 and 8, described below.

The dripper 450 is a solid or hollow body of material generally positioned (in whole or in part) outside of the interior space 462 and along the longitudinal axis L. The dripper 450 has a shape (or outer geometry) defined by a dripper outside surface 409. The dripper outside surface 409 extends to and terminates at a dripper tip 413, which may be sharp or blunt. The dripper 450 may be symmetrical about the longitudinal axis L, with the dripper tip 413 being located on the longitudinal axis L. At least a portion of the dripper 450 has a tapering or converging geometry. Thus in the illustrated embodiment, the dripper 450 includes a tapered dripper section 417 that tapers or converges toward the longitudinal axis L in a direction toward the dripper tip 413 (i.e., in the downward direction from the perspective of FIG. 4). The tapered dripper section 417 may taper in a linear or curved manner. That is, the tapered dripper section 417 may have a straight conical (or frusto-conical) profile, or a curved profile such as a parabolic profile, a hyperbolic profile, or some other curved profile. The configuration of the dripper 450 and its dripper tip 413 may be sized to promote the formation of small liquid droplets, and subsequent release (or separation) of the small liquid droplets from the dripper tip 413 with little or no velocity components other than a gravitationally-influenced, straight-downward directed velocity component of low magnitude. This configuration is thus advantageous for collecting liquid in small fraction collection vessels or vessels with small openings.

In other embodiments, the dripper 450 may be oriented at an angle to the longitudinal axis L, and thus at an angle and extending to the vertical wall of a fraction collection vessel. Such an embodiment may be constructed from one or more individual pieces.

The dripper 450 may further include a spherical section 421 transitioning to the tapered dripper section 417. In this case, a portion of the dripper 450 tapers or diverges away from the longitudinal axis L and transitions to another portion of the dripper 450 that tapers or converges toward the longitudinal axis L. In the present context, for convenience the term "spherical" also encompasses pseudo-spherical geometries that likewise partially diverge away from and partially converge toward the longitudinal axis L, but have an eccentricity different from that defining a perfect sphere, such as an ellipsoidal geometry. Moreover, the spherical section 421 may be part of a complex or composite geometry. For example, the spherical section 421 may be part of a teardrop-shaped geometry, or a geometry having racetrack-shaped profile (from the perspective of the plane of the drawing sheet of FIG. 4) in which the upper and lower hemispherical halves of the spherical section 421 are separated by an intervening cylindrical section.

The dripper 450 may further include a radiused section 425 providing a transition between the spherical section 421 and the tapered dripper section 417. In the present context, the radiused section 425 is "radiused" in that its radius relative to the longitudinal axis L varies in a linear or curved manner as needed to provide a smooth transition. When curved, the radiused section 425 may be concave, convex, or partially concave and partially concave (as illustrated).

The dripper 450 may be fixed in position through attachment to some part of the shell 442. As one non-limiting example, the dripper 450 may be attached to the transverse plate 470, such as by engagement with a fastener 629 (FIG. 6). The fastener 629 may be a threaded fastener (e.g., a screw, bolt, etc.) that is inserted through a bore 633 of the plate 470 and threaded into a threaded bore 637 of the dripper 450. In the embodiment specifically illustrated in FIG. 6, the dripper 450 includes a cylindrical section or post 641 elongated along the longitudinal axis L and located above the tapered dripper section 417. The post 641 extends axially through the interior space 462, and the threaded bore 637 is formed at the upper end of the post 641. Also in the illustrated embodiment, the spherical section 421 when included is disposed between the post 641 and the tapered dripper section 417 and transitions to the post 641.

The dripper 450 may be axially positioned relative to the fingers 486 such that the fingertips 498 are proximate to the dripper outside surface 409. By this configuration, a stream of liquid flowing along and above finger 486 may continue onto a location of the dripper outside surface 409 proximate to that finger 486. In the present context, the term "proximate" encompasses an embodiment in which the fingertips 498 are adjacent to the dripper outside surface 409 but spaced from the dripper outside surface 409 by a gap, and an alternative embodiment in which the fingertips 498 are adjacent to the dripper outside surface 409 and in physical contact with the dripper outside surface 409. In the former embodiment, the gap may be small enough to enable the liquid stream to cohesively traverse the gap due to surface tension. In the illustrated embodiment, the fingertips 498 are proximate to the spherical section 421 of the dripper 450.

The dripper 450 may be axially positioned relative to the fingers 486 such that each gas exit port 405 is bounded by the dripper outside surface 409 as well as two adjacent fingers 486. In the illustrated embodiment, the gas exit ports 405 are bounded by an upper portion of the spherical section 421.

As also illustrated in FIGS. 4-6, the gas-liquid separator 400 may include a support structure 445 which in assembled form is disposed in the shell 442. The support structure 445 includes a support structure outside surface 449 coaxial with the longitudinal axis L. Thus in this embodiment, the interior space 462 includes an annular region defined between the shell inside surface 458 and the support structure outside surface 449. The support structure 445 may include a support structure tapered section along which the support structure outside surface 449 tapers down (i.e., the diameter of the support structure outside surface 449 reduces) in a direction toward the dripper 450 and the longitudinal axis L. Consequently, in this embodiment the cross-sectional flow area of the annular region of the interior space 462 expands (increases) in the direction toward the dripper 450 and the longitudinal axis L, as best shown in FIGS. 4 and 5. This configuration thus provides an increasing volume in the interior space 462 through which the expanding gas can circulate before exiting the gas-liquid separator 400 via the gas exit ports 405.

The support structure 445 may also include an annular recess or undercut 453 coaxial with the longitudinal axis L. The annular recess 453 may be positioned at the same elevation (relative to the longitudinal axis L) as the inlet bore 474 formed through the side of the main body 454 of the shell 442. The support structure outside surface 449 may have a circular (concave) profile at the annular recess 453 that is complementary to the circular (convex) profile of the outer surface of the fluid entry tube 482. Thus in this embodiment, the interior space 462 includes a second annular region defined between the shell inside surface 458 and the annular recess 453, above the first annular region defined between the shell inside surface 458 and the (tapered portion of the) support structure outside surface 449 below the annular recess 453. By this configuration, the fluid entry tube 482 is inserted through the inlet bore 474 and into the second annular region, proximate to the annular recess 453 and with or without contacting the annular recess 453. Consequently, fluid emitted from the fluid entry tube 482 initially flows into the second annular region.

As shown in FIG. 6, in an embodiment that includes both the support structure 445 and the post 641 of the dripper 450, the support structure 445 may include a bore 657 on the longitudinal axis L. During assembly, the post 641 is inserted into the bore 657, and the fastener 629 is inserted through the bore 633 of the plate 470 and into threaded engagement with the threaded bore 637 of the post 641. The post 641 may be inserted far enough into the bore 657 that the bottom end of the support structure 445 comes into contact with a portion of the dripper outside surface 409, such as at the spherical section 421. In this case, in assembled form the dripper 450 is positioned adjacent to the support structure 445 such that the support structure outside surface 449 transitions to the dripper outside surface 409, as shown in FIGS. 4 and 5. Also in this embodiment, the support structure 445 may be integral with or attached to the plate 470.

In some embodiments, the shell 442 (or at least the shell inside surface 458), and/or the outlet structure 446 (or at least the finger inside surfaces 494), and/or the support structure 445 (or at least the support structure outside surface 449) are composed of a non-wettable (or hydrophobic), low-friction material, which in some embodiments may be the result of a surface treatment or coating as described earlier in this disclosure. Examples of non-wettable materials include, but are not limited to, fluorocarbon polymers such as polytetrafluoroethylene (PTFE). Additionally or alternatively, in some embodiments the dripper 450 (or at least the dripper outside surface 409) is composed of a wettable (or hydrophilic) material, which likewise in some embodiments may be the result of a surface treatment or coating as described earlier in this disclosure. Examples of wettable materials include, but are not limited to, various metals (e.g., stainless steel), glasses, and ceramics. Moreover, the dripper outside surface 409 may be smooth (low surface roughness), mechanically polished, or electro-polished. The differential wetting properties of the materials utilized promote the movement of coalesced liquid from the shell 442 and the outlet structure 446 onto the dripper 450, and from the support structure 445 onto the dripper 450. The movement of liquid through the gas-liquid separator 400 is described further below.

Figure 7:
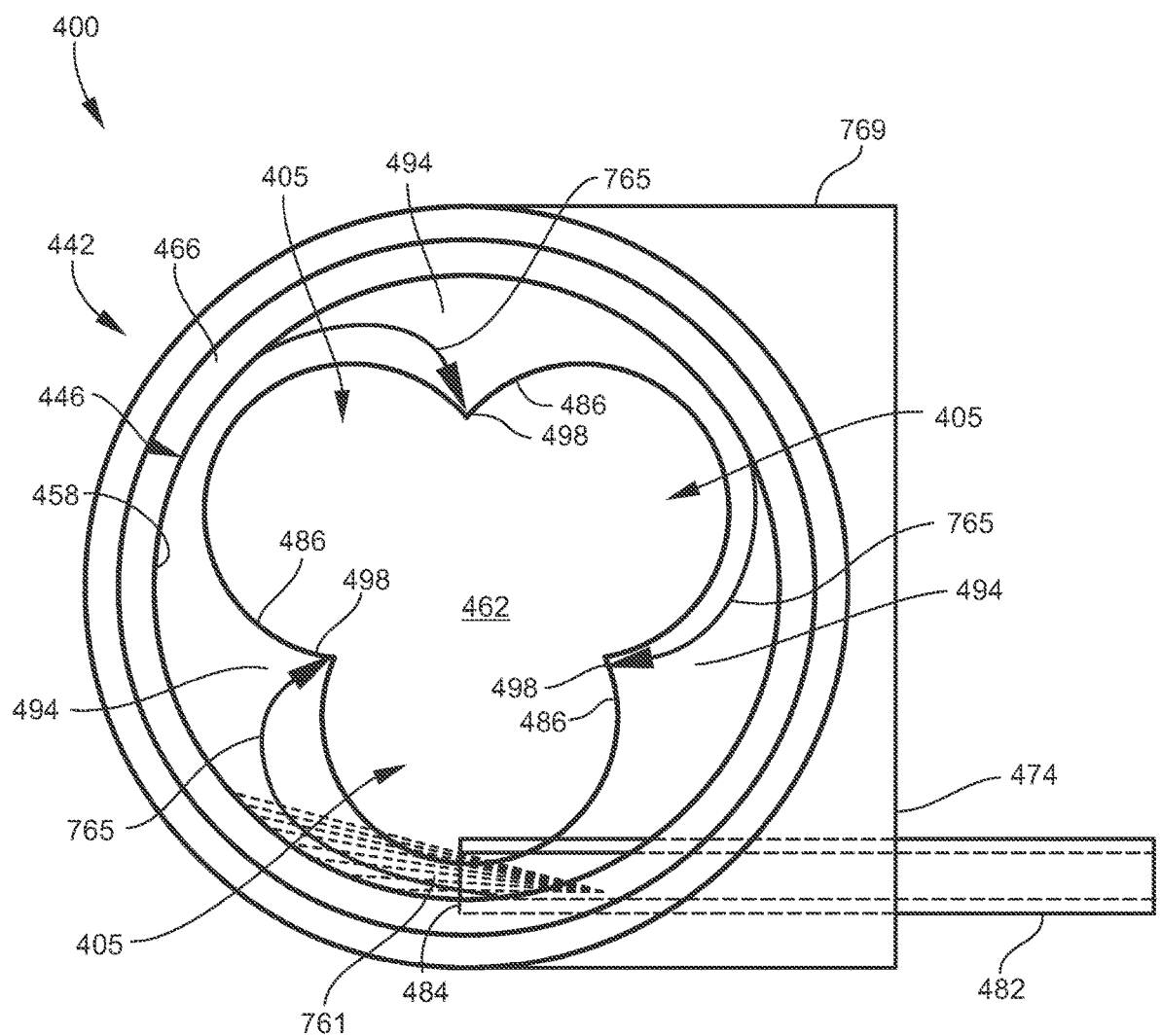
FIG. 7 is a top plan view of the gas-liquid separator illustrated in FIGS. 4-6, illustrating a shell, an outlet structure, and a fluid entry tube thereof.

FIG. 7 is a top plan view of the gas-liquid separator 400, illustrating the shell 442, the outlet structure 446, and the fluid entry tube 482. The plate 470, the support structure 445, and the dripper 450 have been removed to provide a clear view into the interior space 462 from the top of the shell 442. The plan view corresponds to the plane transverse to the longitudinal axis L (see FIGS. 4 and 5). In the transverse plane, the fingers 486 converge toward the longitudinal axis L (and thus toward the dripper 446 when present) along respective radial directions. Moreover, the edges of the outlet structure 446 defining the fingers 486 converge to respective fingertips 498. The inlet bore 474 and thus the fluid entry tube 482 are oriented along a tangential direction relative to the circular shell inside surface 458. For example, the inner surface of the fluid entry tube 482 that defines the outer perimeter of the inner bore of the fluid entry tube 482 may be (substantially) collinear with a line tangent to the circular shell inside surface 458. In this case, the fluid entry axis (or central axis of the fluid entry tube 482) is parallel to (offset from) this tangent line. By this configuration, fluid 761 emitted from the fluid entry tube 482 enters the interior space 462 along a tangential fluid inlet flow path and, unlike conventional cyclonic separators, impacts the shell inside surface 458 immediately, which promotes gas-liquid separation. The angle of impact, however, is shallow enough to minimize post-impact rebounding of droplets from the shell inside surface 458 and prevent re-aerosolization of the liquid with the separated gas. The gaseous components of fluid 761 exiting fluid entry tube 482 will tend to expand causing the interspersed liquid droplets to exit in a generally conical shape (illustratively exaggerated in FIG. 7). The conical shape of exiting liquid 761 provides some slight range in impact angle, though it can generally be thought of as a single angle in describing basic operational principles. Subsequently, the liquid, aided by gravity, flows circularly and downward along the shell inside surface 458. The flowing liquid subsequently transitions to flow along the finger inside surfaces 494, as schematically depicted by liquid flow paths (or flow directions) 765. The operation of the gas-liquid separator 400 is described in further detail below.

In other embodiments, the inlet bore 474 (and thus the fluid entry tube 482) may be oriented at an angle relative to the tangential direction (which is horizontal in FIG. 7), and/or at an upward or downward angle relative to the horizontal transverse plane from the perspective of the elevation view of FIG. 4. An embodiment containing this angular entry promotes more immediate impact with larger impact angle. The higher impact angle can be favorable in promoting coalescence of droplets if kept below rebound thresholds. Other embodiments depart from symmetrically shaped fingers 486 and gas exit ports 405 shown in the Figures. The fingers 486 may be advantageously trimmed, eliminating material along the side opposite to the general direction in which the liquid is traveling, into an exemplary crescent-like shape. The fingers 486, thinned by trimming, still support the liquid stream flowing to the dripper 450. Moreover, having been thinned in width, the fingers 486 more quickly drain solvent onto the dripper 450 upon stoppage of incoming flow.

As also shown in FIG. 7, the shell 442 may include a side structure 769 extending from the side of the shell 442 in the transverse plane. The side structure 769 may be shaped, for example, as a plate or block. The inlet bore 474 is formed through, and thus the fluid entry tube 482 is inserted through, the side structure 769. The side structure 769 may provide various functions such as, for example, facilitating the creation of a fluid-sealing interface between the fluid entry tube 482 and the shell 442, enhancing structural support for the fluid entry tube 482, and/or facilitating the mounting of the gas-liquid separator 400 to another structure.

Figure 8:
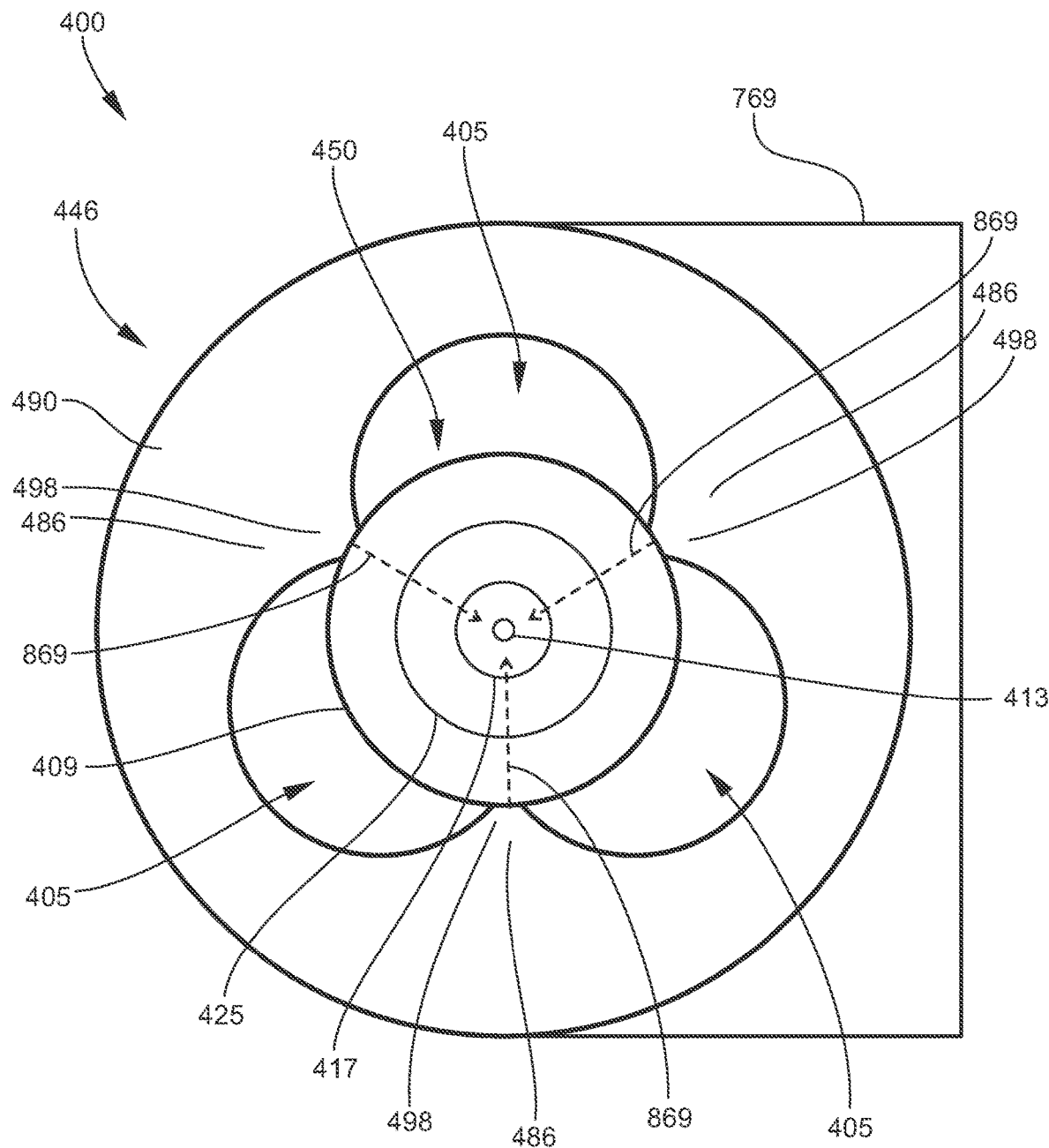
FIG. 8 is a bottom plan view of the gas-liquid separator illustrated in FIGS. 4-6, illustrating primarily the outlet structure and a dripper thereof.

FIG. 8 is a bottom plan view of the gas-liquid separator 400, illustrating primarily the outlet structure 446 and the dripper 450. The plate 470, the support structure 445, and the fluid entry tube 482 above the outlet structure 446 and the dripper 450 (or behind these components, from the perspective of FIG. 8) have been removed for clarity.

The operation of the gas-liquid separator 400 will now be described with reference primarily to FIGS. 4, 7, and 8. An aerosolized fluid 761 comprising liquid droplets interspersed in an expanding gas is emitted from the fluid entry tube 482 along the tangential fluid inlet flow path (FIG. 7). The tangential fluid inlet flow path is offset from the center of the interior space 462 (longitudinal axis L) by a radial distance that locates the tangential fluid inlet flow path at or near the shell inside surface 458. In the context of a supercritical fluid separation system such as described above and illustrated in FIGS. 1-3, the aerosolized fluid may be a column effluent resulting from a chromatographic separation (SFC) or extraction (SFE) process in which a sample was injected into a mobile phase at a point upstream of the separation column 104 and then driven through the column 104, combined with any additional make-up flow supplied by make-up fluid pump 168. Namely, the gas may comprise a primary (typically non-polar) solvent that was previously a column eluent, and the liquid droplets may comprise sample fractions dissolved in a sample solvent and/or one or more polar co-solvents added to the primary solvent. Depending on where the gas-liquid separator 400 is positioned relative to a target fraction collection vessel, the gas exit ports 405 communicate with the ambient directly or with the interior of the vessel, which may be vented directly to the atmosphere or within some external containment structure.

Upon introduction into the interior space 462 from the fluid entry tube 482, the gas immediately starts to separate from the liquid and continues to expand. The gas swirls around the interior space 462, generally following a downward helical path, and exits the gas-liquid separator 400 via the gas exit ports 405, as schematically depicted by arrows 522 in FIG. 5. The liquid, which may exit the fluid entry tube 482 mostly in the form of liquid droplets, generally follows the tangential fluid inlet flow path shown in FIG. 7 upon exiting the fluid entry tube 482. The gaseous components of fluid 761 exiting fluid entry tube 482 will tend to expand causing the interspersed liquid droplets to exit in a generally, though slight, conical shape (illustratively exaggerated in FIG. 7). The velocity, momentum, and shape, of the flow stream exiting the fluid entry tube 482 is generally dependent upon flow rate and size (inner diameter) of fluid entry tube 482. A liquid stream is formed from a coalescence (or merging) of liquid droplets into larger droplets upon the shell inside surface 458 and eventually forming into a continuous stream or sheet. Most or all of the liquid droplets immediately impact the shell inside surface 458. A small portion of the liquid droplets may remain interspersed in the gas for a brief period of time, after which such liquid droplets eventually impact, due to the outward radial component of their momentum, the shell inside surface 458 or previously impacted companion liquid (as discussed below) sheeting along the shell inside surface 458. The spreading of the impacting liquid over an area wider than the internal diameter of fluid entry tube 482 creates wide, thin, liquid stream with an initially high rotational velocity, beginning to sheet along shell inside surface 458. This process allows further release of entrained gases from the impacting liquid.

After contacting the shell inside surface 458, the liquid flows along the shell inside surface 458, with a prominent circumferential component, which has a slight downwardly-directed axial component due in part to gravity, as one liquid flow path. In the present context, the term "axial" is associated with the longitudinal axis L, which is the vertical axis from the perspective of the elevation view of FIG. 4. Thus, the resultant liquid flow path may be considered as being generally helical. With sufficient velocity exiting fluid entry tube 482, and appropriate inner surface radial dimensions, the downward component of velocity from gravity is reduced. The reduction in downward velocity allows the liquid to form a sheet of liquid circulating along the shell inside surface 458. The liquid generally moves as a circulating sheet with downward direction, along the shell inside surface 458, while being vertically compressed by selection of shell inside surface 458 height. By this configuration, an individual stream (or sheet) 765 of liquid may merge into itself while circulating along shell inside surface. The movement of the liquid becomes uniform as fluidic elements of liquid reach the interface of the shell inside surface 458 and outlet structure 446. Subsequently, near the interface between the shell inside surface 458 and outlet structure 446, the fluid branches into one or more streams 765, each stream transiting over each finger 486 along the finger inside surfaces 494.

The gas-liquid separator 400 is configured such that the fluid dynamics of the liquid flowing along the inside surfaces is largely controlled by the liquid itself. The flowing liquid, in effect, favorably interacts with itself to reduce its overall velocity, in a way that is achievable in a gas-liquid separator 400 of significantly reduced physical size in comparison to known separators. While the fluidic elements of the liquid naturally reduce in velocity as they travel in their flow paths along the inside surfaces due to loss of kinetic energy, the velocity reduction of the fluidic elements is further enhanced by forcing higher-velocity elements entering the gas-liquid separator 400 to interact with the lower-velocity elements that previously entered the gas-liquid separator 400. This forced interaction between the higher-velocity elements and the lower-velocity elements provides a shear force or drag force against the higher-velocity elements. With sufficiently reduced velocities toward the bottom end of the interior space 462 of the gas-liquid separator 400, and being held together as a cohesive stream by its own surface tension, the liquid is able to travel along the tapered inside surface of the outlet structure 446 and along the fingers 486, and continue onto the centrally located dripper 450. As a further advantage, the initial impact and subsequent radial circulation of the liquid inside the gas-liquid separator 400 is sufficiently powerful to enable much of the gas entrained in the liquid to be released from the liquid prior to the liquid being collected on the dripper and transferred to a fraction collection vessel.

As the liquid droplets are emitted from the fluid entry tube 482 most of the liquid droplets impact the shell inside surface 458. Some liquid droplets, however, may impact the support structure outside surface 449 of the support structure 445, instead of the shell inside surface 458. This will largely result during the initial starting and subsequent stoppage of fluid flow through the fluid entry tube 482. Consequently, additional liquid streams may be formed, and further coalescence of liquid droplets into larger droplets may occur, on the support structure outside surface 449. Liquid may thus flow in a generally downward direction along the support structure outside surface 449 ultimately rejoining the predominant liquid stream at the dripper 450. The additional flow paths provided by the support structure 445 thus contribute to the recovery of the sample fractions supplied from the fluid entry tube 482 through operation of the gas-liquid separator 400. By this configuration, loss of liquid-phase components through the gas exit ports 405 is minimized or eliminated. Moreover, after stoppage of fluid flow through the fluid entry tube 482, liquid flowing on the surfaces inside the gas-liquid separator 400 will continue to drain downward and onto the dripper 450 due to gravity and residual kinetic energy. Such continued drainage and downward movement of liquid may be enhanced by providing non-wettable surfaces as described herein. For the foregoing, it is evident that the gas-liquid separator 400 is configured so as to not retain liquid therein.

The liquid streams from the finger inside surfaces 494 and the support structure outside surface 449 then transition to the dripper outside surface 409 of the dripper 450 (FIG. 4). That is, the dripper 450 is positioned on the longitudinal axis L at an elevation relative to the fingertips 498 and the support structure 445 that enables the dripper 450 to serve as a common drainage site for liquid flowing along both the finger inside surfaces 494 and the support structure outside surface 449. The transition of liquid onto the dripper outside surface 409 may be facilitated by the dripper outside surface 409 being a wettable surface, as described above. FIG. 8 schematically depicts liquid flow paths (or general directions of liquid flow) 869 of the liquid along the dripper outside surface 409 directed generally toward the dripper tip 413. With the wettability of the dripper outside surface 409 being enhanced, individual liquid streams from respective fingertips 498 may spread out and merge with each other, forming liquid sheets on the dripper outside surface 409. Under the influence of gravity, liquid eventually separates from the dripper outside surface 409 (particularly at the dripper tip 413) and falls as droplets into the interior of the fraction collection vessel that is aligned with the dripper 450. The convergence of collectable liquid at the dripper tip 413 facilitates depositing the liquid droplets into a fraction collection vessel having a small-diameter opening.

From the foregoing, it is evident that the gas-liquid separator 400 defines one or more liquid flow paths from the fluid inlet 438, and one or more gas flow paths from the fluid inlet 438 that are separate from the liquid flow path(s). The one or more liquid flow paths generally run along the shell inside surface 458 to one or more of the finger inside surfaces 494, along one or more of the finger inside surfaces 494 to the dripper outside surface 409, and along the dripper outside surface 409 to the dripper tip 413. One or more additional liquid flow paths may also generally run along the support structure outside surface 449 to the dripper outside surface 409, and along the dripper outside surface 409 to the dripper tip 413. The one or more gas flow paths generally run through the interior space 462 of the shell 442 and through the gas exit ports 405. Further, the configuration of the elements of gas-liquid separator 400 determine the dynamic behavior of the gas and liquid components being separated and allow the physical size and contained volumes of the gas-liquid separator 400 to be significantly reduced while operating at ambient pressures. Moreover, the reduced internal volumes and small fluid transit delay minimizes intermixing to maintain purity of previously separated sample compounds being collected.

Figure 9:
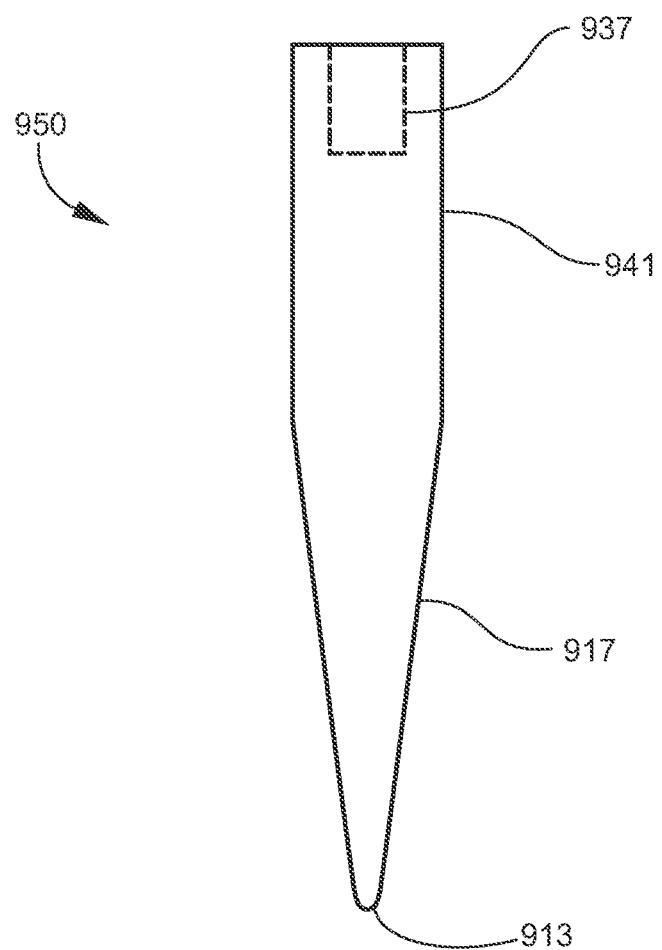
FIG. 9 is an elevation view of an example of a dripper according to an embodiment disclosed herein.

FIG. 9 is an elevation view of an example of a dripper 950 according to another embodiment. The dripper 950 may predominantly consist of a tapered dripper section 917 that terminates at a dripper tip 913. In some embodiments, an upper portion of the dripper 950 may be a straight cylindrical section 941 that transitions to the tapered dripper section 917, similar to the post 641 shown in FIG. 6. A threaded bore 937 may be formed at the upper end of the tapered dripper section 917 or the straight cylindrical section 941 if provided. The dripper 950 may be positioned along the longitudinal axis L such that the tapered dripper section 917, or the straight cylindrical section 941 if provided, is proximate to fingertips of fingers 486 of the outlet structure 446 (FIGS. 4-8). The dripper 950 may otherwise be configured and function in a manner analogous to the dripper 450 described above and illustrated in FIGS. 4-8.

Figure 10:
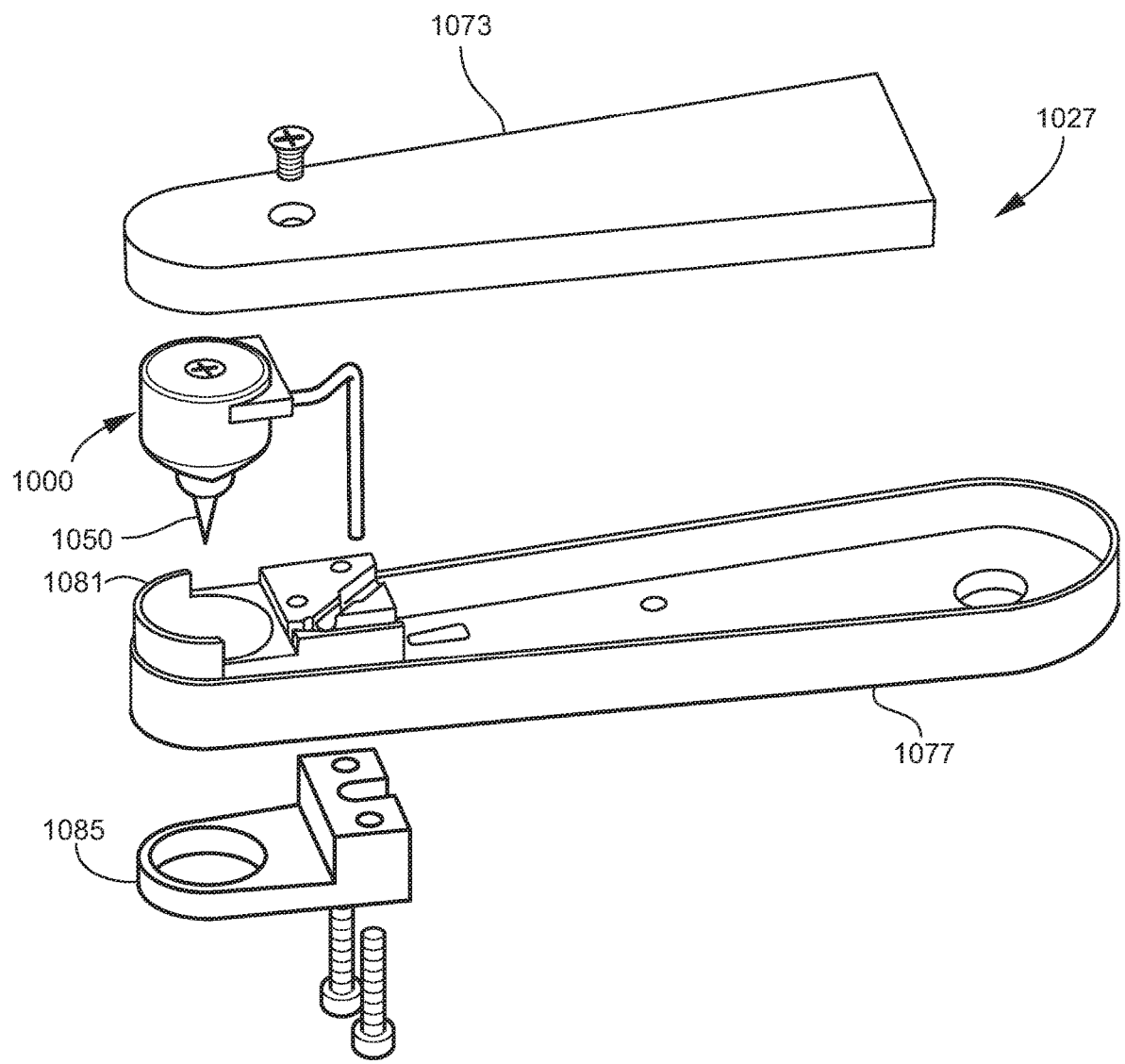
FIG. 10 is a perspective exploded view of a gas-liquid separator and a movable arm to which the gas-liquid separator may be mounted, according to an embodiment disclosed herein.

FIG. 10 is a perspective exploded view of a gas-liquid separator 1000 (e.g., corresponding to the gas-liquid separator 206, 400, or 900 described above and illustrated in FIGS. 2, 4-8 or FIG. 9, respectively) and a movable arm 1027 to which the gas-liquid separator 1000 may be mounted. The movable arm 1027 may be, for example, a part of the fraction collector 200 described above and illustrated in FIG. 2, and thus may correspond to the above-described movable arm 227. The movable arm 1027 may generally include a first arm piece 1073 attached to a second arm piece 1077 by any suitable fastening means. The movable arm 1027 may be attached to, and actuated by, a robotic assembly (not shown) by any suitable means as generally described earlier in this disclosure and appreciated by persons skilled in the art. The gas-liquid separator 1000 may be mounted in a bore 1081 of the movable arm 1027 by any suitable means. The movable arm 1027 may include a guard structure 1085 configured to protect a dripper 1050 of the gas-liquid separator 1000.

It will be understood that one or more of the processes, sub-processes, and process steps described herein may be performed by hardware, firmware, software, or a combination of two or more of the foregoing, on one or more electronic or digitally-controlled devices. The software may reside in a software memory (not shown) in a suitable electronic processing component or system such as, for example, the system controller 176 schematically depicted in FIG. 1. The software memory may include an ordered listing of executable instructions for implementing logical functions (that is, "logic" that may be implemented in digital form such as digital circuitry or source code, or in analog form such as an analog source such as an analog electrical, sound, or video signal). The instructions may be executed within a processing module, which includes, for example, one or more microprocessors, general purpose processors, combinations of processors, digital signal processors (DSPs), application specific integrated circuits (ASICs), field-programmable gate array (FPGAs), etc. Further, the schematic diagrams describe a logical division of functions having physical (hardware and/or software) implementations that are not limited by architecture or the physical layout of the functions. The examples of systems described herein may be implemented in a variety of configurations and operate as hardware/software components in a single hardware/software unit, or in separate hardware/software units.

The executable instructions may be implemented as a computer program product having instructions stored therein which, when executed by a processing module of an electronic system (e.g., the system controller 176 in FIG. 1), direct the electronic system to carry out the instructions. The computer program product may be selectively embodied in any non-transitory computer-readable storage medium for use by or in connection with an instruction execution system, apparatus, or device, such as an electronic computer-based system, processor-containing system, or other system that may selectively fetch the instructions from the instruction execution system, apparatus, or device and execute the instructions. In the context of this disclosure, a computer-readable storage medium is any non-transitory means that may store the program for use by or in connection with the instruction execution system, apparatus, or device. The non-transitory computer-readable storage medium may selectively be, for example, an electronic, magnetic, optical, electromagnetic, infrared, or semiconductor system, apparatus, or device. A non-exhaustive list of more specific examples of non-transitory computer readable media include: an electrical connection having one or more wires (electronic); a portable computer diskette (magnetic); a random access memory (electronic); a read-only memory (electronic); an erasable programmable read only memory such as, for example, flash memory (electronic); a compact disc memory such as, for example, CD-ROM, CD-R, CD-RW (optical); and digital versatile disc memory, i.e., DVD (optical). Note that the non-transitory computer-readable storage medium may even be paper or another suitable medium upon which the program is printed, as the program may be electronically captured via, for instance, optical scanning of the paper or other medium, then compiled, interpreted, or otherwise processed in a suitable manner if necessary, and then stored in a computer memory or machine memory.

It will also be understood that the term "in signal communication" or "in electrical communication" as used herein means that two or more systems, devices, components, modules, or sub-modules are capable of communicating with each other via signals that travel over some type of signal path. The signals may be communication, power, data, or energy signals, which may communicate information, power, or energy from a first system, device, component, module, or sub-module to a second system, device, component, module, or sub-module along a signal path between the first and second system, device, component, module, or sub-module. The signal paths may include physical, electrical, magnetic, electromagnetic, electrochemical, optical, wired, or wireless connections. The signal paths may also include additional systems, devices, components, modules, or sub-modules between the first and second system, device, component, module, or sub-module.

More generally, terms such as "communicate" and "in . . . communication with" (for example, a first component "communicates with" or "is in communication with" a second component) are used herein to indicate a structural, functional, mechanical, electrical, signal, optical, magnetic, electromagnetic, ionic or fluidic relationship between two or more components or elements. As such, the fact that one component is said to communicate with a second component is not intended to exclude the possibility that additional components may be present between, and/or operatively associated or engaged with, the first and second components.

It will be understood that various aspects or details of the invention may be changed without departing from the scope of the invention. Furthermore, the foregoing description is for the purpose of illustration only, and not for the purpose of limitation—the invention being defined by the claims.

What is claimed is:

1. A gas-liquid separator, comprising:
  a fluid inlet;
  a shell communicating with the fluid inlet, the shell comprising a shell inside surface surrounding a longitudinal axis and enclosing an interior space;
  an outlet structure comprising a plurality of fingers circumferentially spaced from each other about the longitudinal axis, the fingers converging toward the longitudinal axis and terminating at respective fingertips, and the fingers comprising respective finger inside surfaces generally facing toward the longitudinal axis;
  a dripper comprising a dripper tip positioned outside of the interior space and a dripper outside surface extending to the dripper tip, wherein the fingertips are proximate to the dripper outside surface; and
  a gas exit port bounded by the dripper outside surface and two adjacent fingers, wherein:
  the gas-liquid separator defines a liquid flow path from the fluid inlet, along the shell inside surface, along one or more of the finger inside surfaces, along the dripper outside surface, and to the dripper tip; and
  the gas-liquid separator defines a gas flow path from the fluid inlet, through the interior space, and through the gas exit port.

2. The gas-liquid separator of claim 1, wherein at least one of the shell inside surface and the finger inside surfaces have a composition selected from the group consisting of: a non-wettable material, a fluorocarbon polymer, and polytetrafluoroethylene (PTFE).

3. The gas-liquid separator of claim 1, wherein the dripper outside surface has a composition selected from the group consisting of: a wettable material, a ceramic, a glass, a metal, and stainless steel.

4. The gas-liquid separator of claim 1, wherein the outlet structure comprises a cylindrical or tapered section between the shell inside surface and the fingers.

5. The gas-liquid separator of claim 1, comprising a plate facing the interior space, wherein the dripper is attached to the plate.

6. The gas-liquid separator of claim 1, wherein the fingertips are spaced from the dripper outside surface by respective gaps, or the fingertips contact the dripper outside surface.

7. The gas-liquid separator of claim 1, comprising a support structure disposed in the shell and comprising a support structure outside surface, wherein the interior space comprises an annular region defined between the shell inside surface and the support structure outside surface.

8. The gas-liquid separator of claim 7, wherein the dripper is positioned adjacent to the support structure such that the support structure outside surface transitions to the dripper outside surface.

9. The gas-liquid separator of claim 7, wherein the annular region has a cross-sectional flow area in a plane orthogonal to the longitudinal axis, and the support structure comprises a conical section tapering in a direction toward the dripper, such that the cross-sectional flow area increases in the direction toward the dripper.

10. The gas-liquid separator of claim 7, wherein the support structure comprises an annular recess, and the fluid inlet comprises a tube positioned between the shell inside surface and the annular recess.

11. The gas-liquid separator of claim 1, wherein the dripper comprises a tapered dripper section tapering in a direction toward the dripper tip.

12. The gas-liquid separator of claim 11, wherein the tapered dripper section is proximate to the fingertips.

13. The gas-liquid separator of claim 11, wherein the dripper comprises a cylindrical section proximate to the fingertips and transitioning to the tapered dripper section.

14. The gas-liquid separator of claim 11, wherein the dripper comprises a spherical section proximate to the fingertips and transitioning to the tapered dripper section.

15. The gas-liquid separator of claim 11, wherein the tapered dripper section has a profile selected from the group consisting of: a straight conical profile, a curved profile, a parabolic profile, and a hyperbolic profile.

16. The gas-liquid separator of claim 1, wherein at least a portion of the shell inside surface is a cylindrical inside surface, and the fluid inlet is oriented to emit fluid in a direction tangential to the cylindrical inside surface, or in a direction angled to a tangent of the cylindrical inside surface.

17. The gas-liquid separator of claim 1, wherein the gas exit port is one of a plurality of gas exit ports circumferentially spaced from each other about the longitudinal axis, each gas exit port bounded by the dripper outside surface and two adjacent fingers.

18. A method for separating a fluid into a liquid and a gas, the method comprising:
    emitting the fluid into the interior space of the gas-liquid separator of claim 1, the fluid comprising liquid droplets carried in a gas, wherein the liquid droplets begin to separate from the gas in the interior space and coalesce into a liquid stream flowing across the shell inside surface surrounding the interior space;
    merging liquid from the liquid stream onto the dripper, wherein the liquid flows across the dripper to the dripper tip and separates from the dripper tip; and
    while merging the liquid, discharging the gas through the gas exit port adjacent to the dripper.

19. The method of claim 18, wherein the inside surface comprises a cylindrical inside surface, and emitting the fluid into the interior space comprises emitting the fluid along a direction tangential to the cylindrical inside surface.

20. The method of claim 18, wherein the inside surface comprises a cylindrical inside surface surrounding an axis, the dripper is positioned on the axis, and the liquid stream flows onto the fingers surrounding the axis and converging toward the dripper, and wherein merging liquid from the liquid stream onto the dripper comprises flowing the liquid along the fingers and onto the dripper from the fingers.

\* \* \* \* \*